US009487330B2

(12) United States Patent
Albaum

(10) Patent No.: US 9,487,330 B2
(45) Date of Patent: Nov. 8, 2016

(54) CONTAINERS AND METHODS FOR MIXING AND DISPENSING BEVERAGE CONCENTRATES

(75) Inventor: Gary J. Albaum, Pleasantville, NY (US)

(73) Assignee: Kraft Foods Group Brands LLC, Chicago, IL (US)

( * ) Notice: Subject to any disclaimer, the term of this patent is extended or adjusted under 35 U.S.C. 154(b) by 322 days.

(21) Appl. No.: 13/820,113

(22) PCT Filed: Sep. 1, 2011

(86) PCT No.: PCT/US2011/050205
§ 371 (c)(1),
(2), (4) Date: May 13, 2013

(87) PCT Pub. No.: WO2012/031120
PCT Pub. Date: Mar. 8, 2012

(65) Prior Publication Data
US 2013/0240564 A1 Sep. 19, 2013

Related U.S. Application Data

(60) Provisional application No. 61/379,664, filed on Sep. 2, 2010.

(51) Int. Cl.
*B67D 7/74* (2010.01)
*B65D 25/08* (2006.01)
(Continued)

(52) U.S. Cl.
CPC ........... *B65D 25/085* (2013.01); *B05B 11/048* (2013.01); *B65D 47/2031* (2013.01); *B65D 51/2892* (2013.01)

(58) Field of Classification Search
CPC ........... B65D 81/32–81/3238; B65D 51/2892; B65D 51/2807; B65D 25/085; B65D 47/2031; B05B 11/048
USPC ............. 222/206–215, 129–145.8, 490, 491, 222/494–497
See application file for complete search history.

(56) References Cited

U.S. PATENT DOCUMENTS

D190,101 S 4/1961 Mangini
D194,165 S 11/1962 Riley et al.
(Continued)

FOREIGN PATENT DOCUMENTS

FR 2078627 A5 11/1971
GB 965508 A 7/1964
(Continued)

OTHER PUBLICATIONS

International search report and written opinion from WO2012/031120.
(Continued)

*Primary Examiner* — Patrick M Buechner
*Assistant Examiner* — Randall Gruby
(74) *Attorney, Agent, or Firm* — Fitch, Even, Tabin & Flannery LLP

(57) ABSTRACT

A container (10) for dispensing a liquid beverage concentrate is provided. The liquid beverage concentrate is formed of a first beverage component, disposed in a body (12), and a second beverage component, disposed within a cartridge (30) at least partially within the body, that are initially isolated. The first and second beverage components can be combined to form the liquid beverage concentrate by moving the cartridge, such as further into the body, to unblock a flow path (36) between the cartridge and the body.

18 Claims, 19 Drawing Sheets

(51) Int. Cl.
*B65D 47/20* (2006.01)
*B65D 51/28* (2006.01)
*B05B 11/04* (2006.01)

(56) References Cited

U.S. PATENT DOCUMENTS

| | | | |
|---|---|---|---|
| 3,347,420 A | 10/1967 | Donoghue | |
| D214,549 S | 7/1969 | Ledewitz | |
| 3,458,076 A * | 7/1969 | Babcock | 215/6 |
| 3,802,604 A * | 4/1974 | Morane | B65D 51/285 |
| | | | 206/222 |
| 3,924,741 A * | 12/1975 | Kachur et al. | 206/221 |
| 4,196,808 A | 4/1980 | Pardo | |
| D280,599 S | 9/1985 | Green | |
| 4,591,050 A * | 5/1986 | Finke et al. | 206/222 |
| D288,526 S | 3/1987 | Parad | |
| 4,727,985 A * | 3/1988 | McNeirney | A61J 1/2093 |
| | | | 206/221 |
| 4,773,529 A * | 9/1988 | Finke et al. | 206/222 |
| 4,865,189 A * | 9/1989 | Guerra et al. | 206/221 |
| 4,875,577 A * | 10/1989 | Hildebrandt et al. | 206/219 |
| 4,984,715 A | 1/1991 | Green | |
| 4,989,758 A | 2/1991 | Keller | |
| D319,970 S | 9/1991 | Beeman | |
| D326,606 S | 6/1992 | Green | |
| 5,135,702 A | 8/1992 | Eales | |
| 5,217,433 A * | 6/1993 | Bunin | 604/89 |
| 5,316,159 A | 5/1994 | Douglas et al. | |
| 5,632,420 A | 5/1997 | Lohrman et al. | |
| 5,769,253 A * | 6/1998 | Gross | B65D 47/2031 |
| | | | 215/235 |
| 5,794,819 A | 8/1998 | Smith | |
| 5,811,060 A * | 9/1998 | Laguna Valderrama | 422/556 |
| 5,823,391 A | 10/1998 | Klauke et al. | |
| 5,839,626 A | 11/1998 | Gross et al. | |
| 5,921,440 A | 7/1999 | Maines | |
| 5,927,549 A * | 7/1999 | Wood | 222/83 |
| D414,104 S | 9/1999 | Klauke et al. | |
| 5,950,819 A * | 9/1999 | Sellars | 206/221 |
| 5,954,213 A | 9/1999 | Gerhart et al. | |
| 5,984,141 A * | 11/1999 | Gibler | A47J 41/0027 |
| | | | 206/219 |
| 6,047,818 A * | 4/2000 | Warby et al. | 206/221 |
| 6,073,803 A * | 6/2000 | Sturm et al. | 222/80 |
| 6,116,445 A * | 9/2000 | Ikemori | B65D 47/0804 |
| | | | 215/254 |
| D439,156 S | 3/2001 | Hall et al. | |
| 6,223,942 B1 | 5/2001 | Markey et al. | |
| 6,722,532 B2 | 4/2004 | Lasserre et al. | |
| 6,984,119 B1 | 1/2006 | Hickman et al. | |
| 7,055,685 B1 * | 6/2006 | Patterson | B65D 51/2892 |
| | | | 206/219 |
| 7,128,245 B2 * | 10/2006 | Lee | B65D 47/2031 |
| | | | 222/212 |
| 7,210,575 B2 * | 5/2007 | Oswald | 206/219 |
| 7,255,250 B2 * | 8/2007 | Pugne | B65D 47/0804 |
| | | | 215/327 |
| 7,448,556 B2 | 11/2008 | Muehlhausen et al. | |
| 7,503,453 B2 * | 3/2009 | Cronin | B65D 47/243 |
| | | | 206/221 |
| D593,875 S | 6/2009 | Gaultier | |
| 7,588,142 B1 * | 9/2009 | Bush | B65D 51/2857 |
| | | | 206/221 |
| D614,024 S | 4/2010 | Eason et al. | |
| D614,046 S | 4/2010 | Piro | |
| D623,054 S | 9/2010 | Eason et al. | |
| D626,434 S | 11/2010 | Massin et al. | |
| 7,854,350 B2 | 12/2010 | Lasserre et al. | |
| 7,870,952 B2 * | 1/2011 | Fontana | 206/222 |
| D645,734 S | 9/2011 | Eason et al. | |
| 8,070,014 B2 * | 12/2011 | Wisniewski | 222/83 |
| 8,151,985 B2 * | 4/2012 | Owoc | 206/219 |
| 8,167,155 B2 * | 5/2012 | Hsieh | 215/6 |
| 8,328,010 B2 * | 12/2012 | Lee | B65D 51/2864 |
| | | | 206/221 |
| 8,336,706 B2 * | 12/2012 | Lee | B65D 25/08 |
| | | | 206/221 |
| 8,603,557 B2 * | 12/2013 | de Cleir et al. | 426/115 |
| 8,720,680 B2 * | 5/2014 | Casey | B65D 81/3222 |
| | | | 206/221 |
| 8,870,844 B2 * | 10/2014 | Perovitch | A61J 1/2093 |
| | | | 604/411 |
| 8,985,377 B2 * | 3/2015 | Lane | A47J 31/18 |
| | | | 206/5 |
| 9,067,716 B2 * | 6/2015 | Cronin | B65D 51/2864 |
| 9,132,950 B1 * | 9/2015 | Anderson | B65D 81/32 |
| 9,242,773 B1 * | 1/2016 | Anderson | B65D 47/0838 |
| 9,242,783 B2 * | 1/2016 | Cho | B65D 51/2892 |
| 2003/0106910 A1 | 6/2003 | Hicks et al. | |
| 2004/0000566 A1 * | 1/2004 | Lowry | A47K 5/122 |
| | | | 222/184 |
| 2004/0112770 A1 * | 6/2004 | Oswald | B65D 51/2885 |
| | | | 206/219 |
| 2004/0149599 A1 * | 8/2004 | Cho | B65D 51/2892 |
| | | | 206/219 |
| 2004/0159562 A1 * | 8/2004 | Takahashi et al. | 206/219 |
| 2005/0150902 A1 * | 7/2005 | Cho | B65D 81/366 |
| | | | 206/219 |
| 2005/0263414 A1 * | 12/2005 | Harilela | B05B 11/0081 |
| | | | 206/221 |
| 2006/0076370 A1 * | 4/2006 | Etesse | 222/494 |
| 2006/0113269 A1 | 6/2006 | Etesse et al. | |
| 2006/0201976 A1 * | 9/2006 | Bloom | B65D 47/2031 |
| | | | 222/494 |
| 2007/0029352 A1 | 2/2007 | Norris et al. | |
| 2007/0119868 A1 * | 5/2007 | Kraemer | B65D 83/0005 |
| | | | 222/256 |
| 2008/0156674 A1 * | 7/2008 | Correale | B65D 81/3222 |
| | | | 206/221 |
| 2009/0026222 A1 | 1/2009 | Seelhofer | |
| 2009/0139882 A1 | 6/2009 | DeJonge | |
| 2010/0032454 A1 * | 2/2010 | Moribata et al. | 222/494 |
| 2012/0080450 A1 * | 4/2012 | Dziersk | B65D 47/08 |
| | | | 222/173 |
| 2012/0114800 A1 * | 5/2012 | McKay | 426/72 |
| 2012/0211526 A1 * | 8/2012 | Dupuis et al. | 222/206 |
| 2013/0075430 A1 * | 3/2013 | Ragnarsson et al. | 222/206 |
| 2013/0112646 A1 * | 5/2013 | Cho | B65D 51/28 |
| | | | 215/227 |
| 2013/0334250 A1 * | 12/2013 | Albaum | 222/129 |
| 2014/0203043 A1 * | 7/2014 | Yamanaka | 222/81 |
| 2014/0263436 A1 * | 9/2014 | Gelov | B65D 47/2031 |
| | | | 222/92 |
| 2015/0083759 A1 * | 3/2015 | Medeiros | B65D 47/2018 |
| | | | 222/494 |
| 2015/0217911 A1 * | 8/2015 | Wilson | B65B 3/04 |
| | | | 222/213 |
| 2015/0266634 A1 * | 9/2015 | Yang | B65D 51/2892 |
| | | | 206/221 |
| 2016/0052695 A1 * | 2/2016 | Lawell | B65D 81/3211 |
| | | | 222/206 |

FOREIGN PATENT DOCUMENTS

| | | | |
|---|---|---|---|
| GB | 1326289 A | | 8/1973 |
| JP | 5016975 A | | 1/1993 |
| WO | 03106292 A1 | | 12/2003 |
| WO | 2006097823 A2 | | 9/2006 |
| WO | 2007053970 A1 | | 5/2007 |
| WO | 2010067047 A1 | | 6/2010 |
| WO | 2011031985 A2 | | 3/2011 |
| WO | 2012082712 A1 | | 6/2012 |

OTHER PUBLICATIONS

LMS Flexible Valves Solid Solutions, Products—Elastomeric Flow-Control Valves, LMS website; http://www.siliconelms.com/products.html (1 pg.).

LMS Flexible Valves Solid Solutions—SimpleSqueeze, LMS website; http://www.siliconelms.com/simplisqueeze.html (1 pg.).

LMS Flexible Valves Solid Solutions—Packaging, LMS website; http://www.siliconelms.com/packaging.html (1 pg.).

* cited by examiner

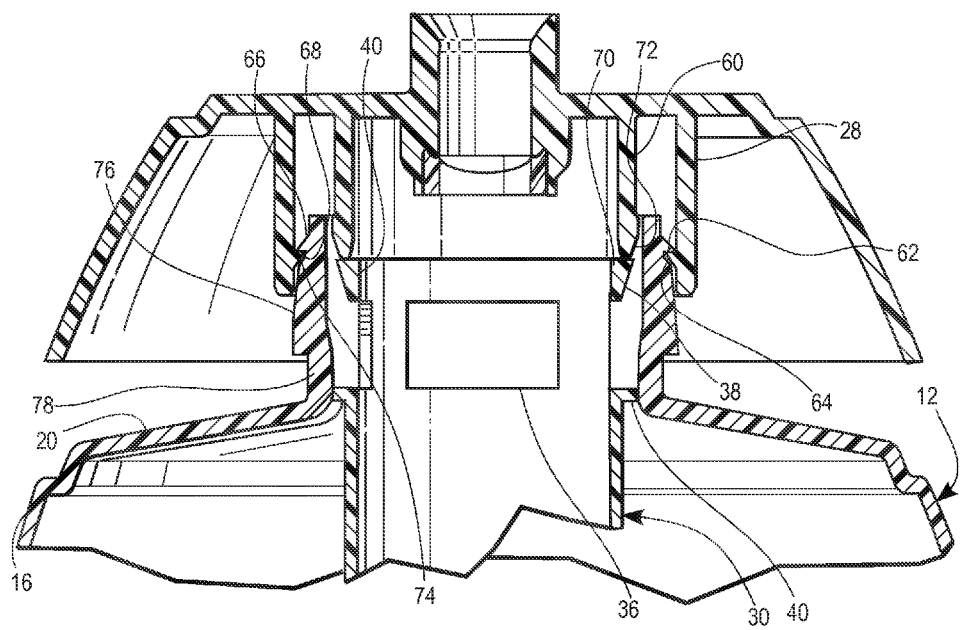
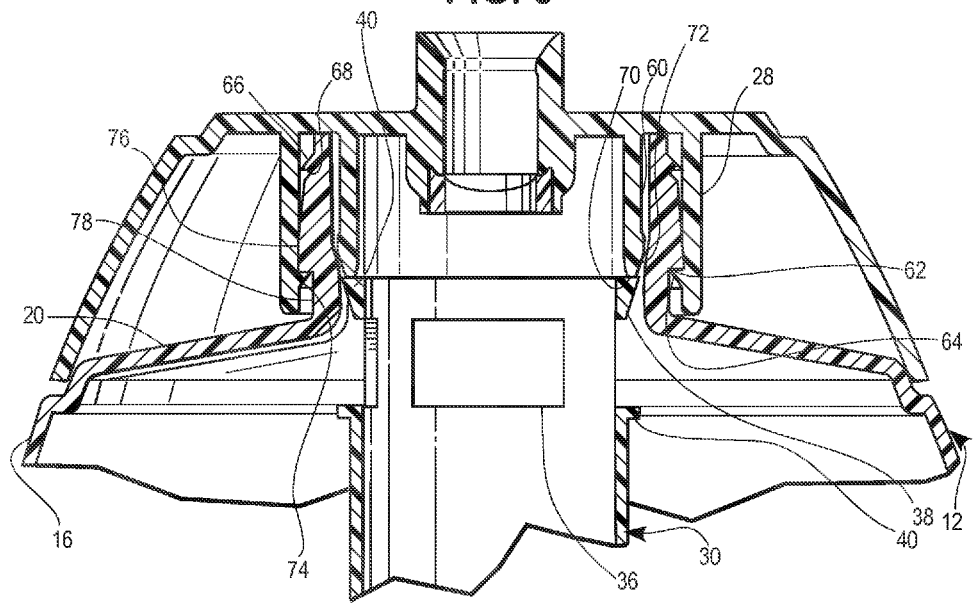

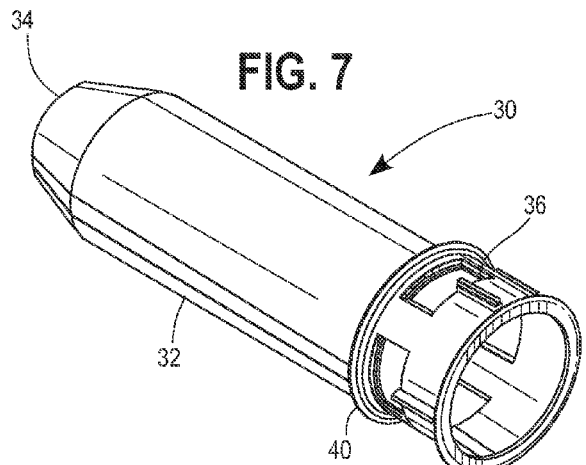
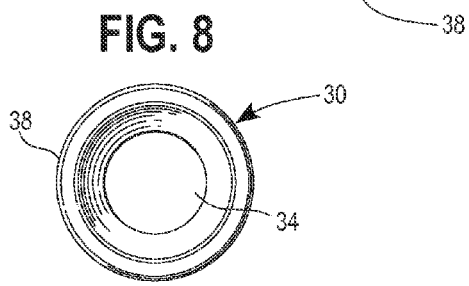
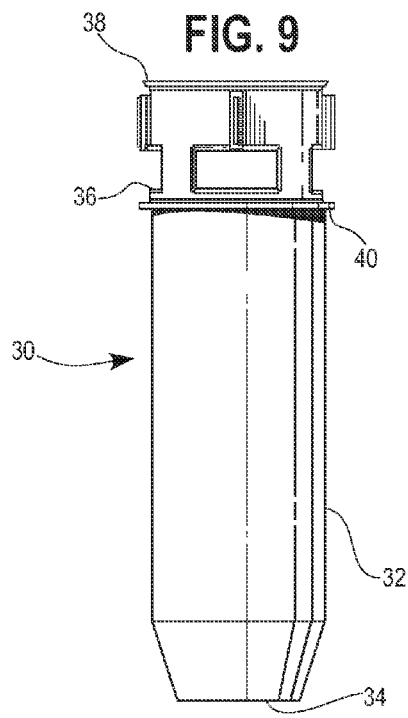
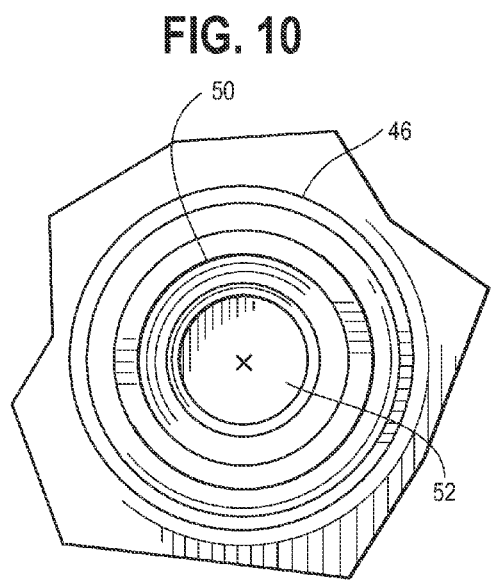

CONTAINERS AND METHODS FOR MIXING AND DISPENSING BEVERAGE CONCENTRATES

CROSS REFERENCE TO RELATED APPLICATION

This application is a U.S. national phase application of International Application No. PCT/US2011/050205, filed Sep. 1, 2011, designating the United States, which claims the benefit of U.S. Appl. No. 61/379,664, filed Sep. 2, 2010, the contents of which are incorporated herein by reference in their entireties.

FIELD

Containers and, methods for dispensing beverage concentrates are described herein and, in particular, contains and methods for separating different beverage concentrate components prior to combining and dispensing.

BACKGROUND

Concentrated liquids can be used to decrease the size of packaging needed to supply a desired quantity of end result product. However, some concentrated liquids may have a shelf life that is less that desired due to certain components. For example, an acid, such as citric or malic acid, added to a liquid concentrate can decrease the shelf life of the liquid concentrate.

Various attempts have been made to separate different components from each other prior to dispensing. Some of those attempts involve providing a device with a smaller chamber having a wall that is punctured to disperse their contents into a larger chamber, such as described in U.S. Pat. No. 7,017,735. Another attempts are described, in U.S. Patent Appl. Publ. Nos. 2008/0116221; 2009/0236303; 2008/0245683. A drawback of such devices is that the smaller chamber can undesirably impede dispensing of the combined components. Indeed, in some instances the smaller chamber is removed after it has been punctured. This can limit, the functionality and convenience of the devices.

Yet another problem with concentrated liquids is that they can include concentrated amounts of dye so that after mixing, the resulting product has the desired coloring. These dyes can stain surfaces, such as clothes, skin, etc., if they come into contact with the surfaces. Due to this, a container storing a concentrated liquid is undesirable if it allows the liquid concentrate to drip or otherwise leak from the container in an uncontrolled manner. One form of container releases a stream of liquid out of an opening when squeezed by a user. When this type of container is utilized to store a concentrated liquid, at least two problems can occur. First, due to the staining problem discussed above, if the concentrated liquid is squeezed into a container having a second liquid therein, undesirable splashing can occur when the stream of concentrated liquid impacts the liquid in the container. This splashed material can then stain the surrounding surfaces, as well as the clothes and skin of a user.

Additionally, unlike squeeze containers storing more solid contents where the amount of material being dispensed can be visually assessed, such as a ketchup or salad dressing bottle, a squeeze container dispensing a liquid concentrate into another liquid can disadvantageously be hard for a user to assess how much concentrated liquid has been dispensed in order to achieve the desired end mixture. Yet another problem can occur as the level of concentrated liquid remaining in the container is reduced during repeated uses. In this situation, the amount of concentrated liquid dispensed using the same squeeze force can disadvantageously change significantly as the liquid concentrate level changes within the container.

SUMMARY

A container for dispensing a liquid beverage concentrate is provided. The liquid beverage concentrate is formed of a first beverage component, disposed in a body, and a second beverage component, disposed within a cartridge at least partially within the body, that are initially isolated. The first and second beverage components can be combined to form the liquid beverage concentrate by moving the cartridge, such as further into the body, to unblock a flow path between the cartridge and the body.

BRIEF DESCRIPTION OF THE DRAWINGS

FIG. 4 is a detailed section view of a neck region of the container taken from region III of FIG. 2, showing the inner cartridge in the unmixed configuration;

FIG. 5 is a detailed section view the neck region of the container similar to that of FIG. 4, but showing the cartridge in a mixed configuration whereby the cap and thereby the cartridge have been moved axially away from the opening to permit the second beverage component to exit and mix with the first beverage component in the body;

FIG. 7 is a perspective view of the cartridge of FIG. 6;

FIG. 8 is a side elevation view of the cartridge of FIG. 6;

FIG. 9 is a top plan view of the cartridge of FIG. 6;

FIG. 10 is an enlarged top plan view of a spout and nozzle of the cap of the container of FIG. 1;

FIG. 33 is a top plan view of a representation of the results of an impact splatter test for a tested nozzle showing a coffee filter with splatter marks thereon;

DETAILED DESCRIPTION

Containers and methods for dispensing a liquid beverage concentrate are described herein, with reference to exemplary embodiments of FIGS. 1-28.

Figure 1:
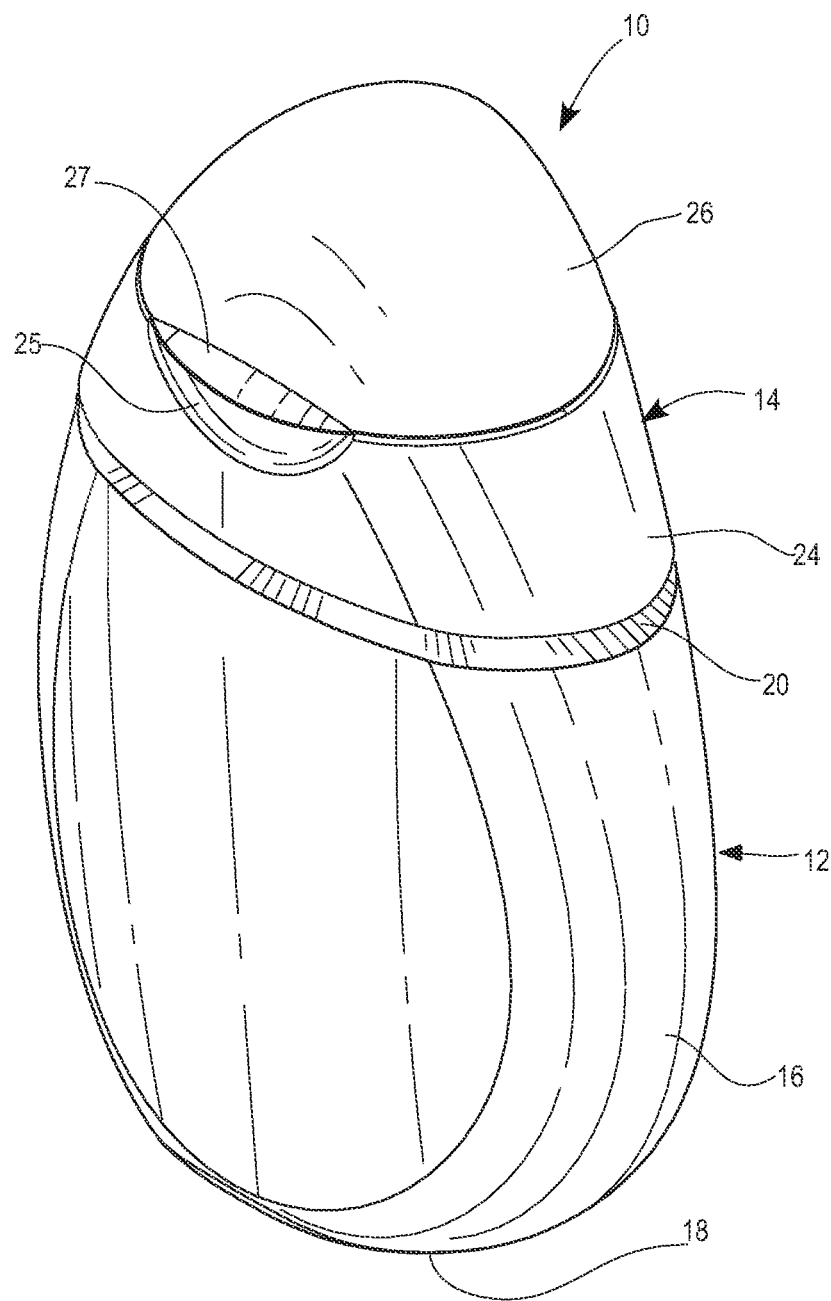
FIG. 1 is a perspective view of an embodiment of a container for dispensing beverage concentrates, showing the container body with a cap having a lid.
Figure 2:
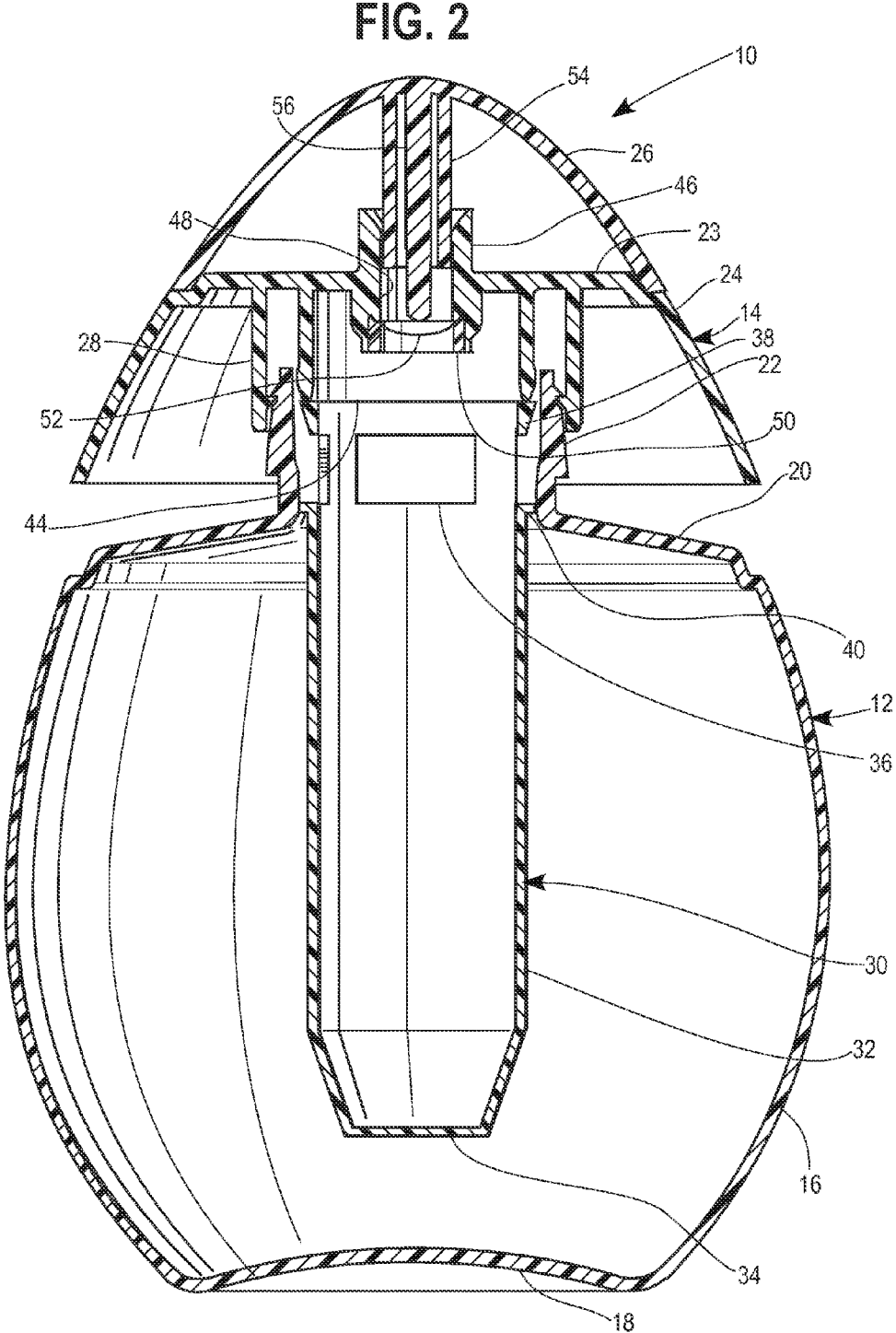
FIG. 2 is a section view of the container of FIG. 1, taken along line II-II and showing the body, cap and lid, as well as an inner cartridge held in an unmixed configuration whereby a first beverage component is stored in the body and a second beverage component is stored in the cartridge which is in a position not in fluid communication with the body.
Figure 3:
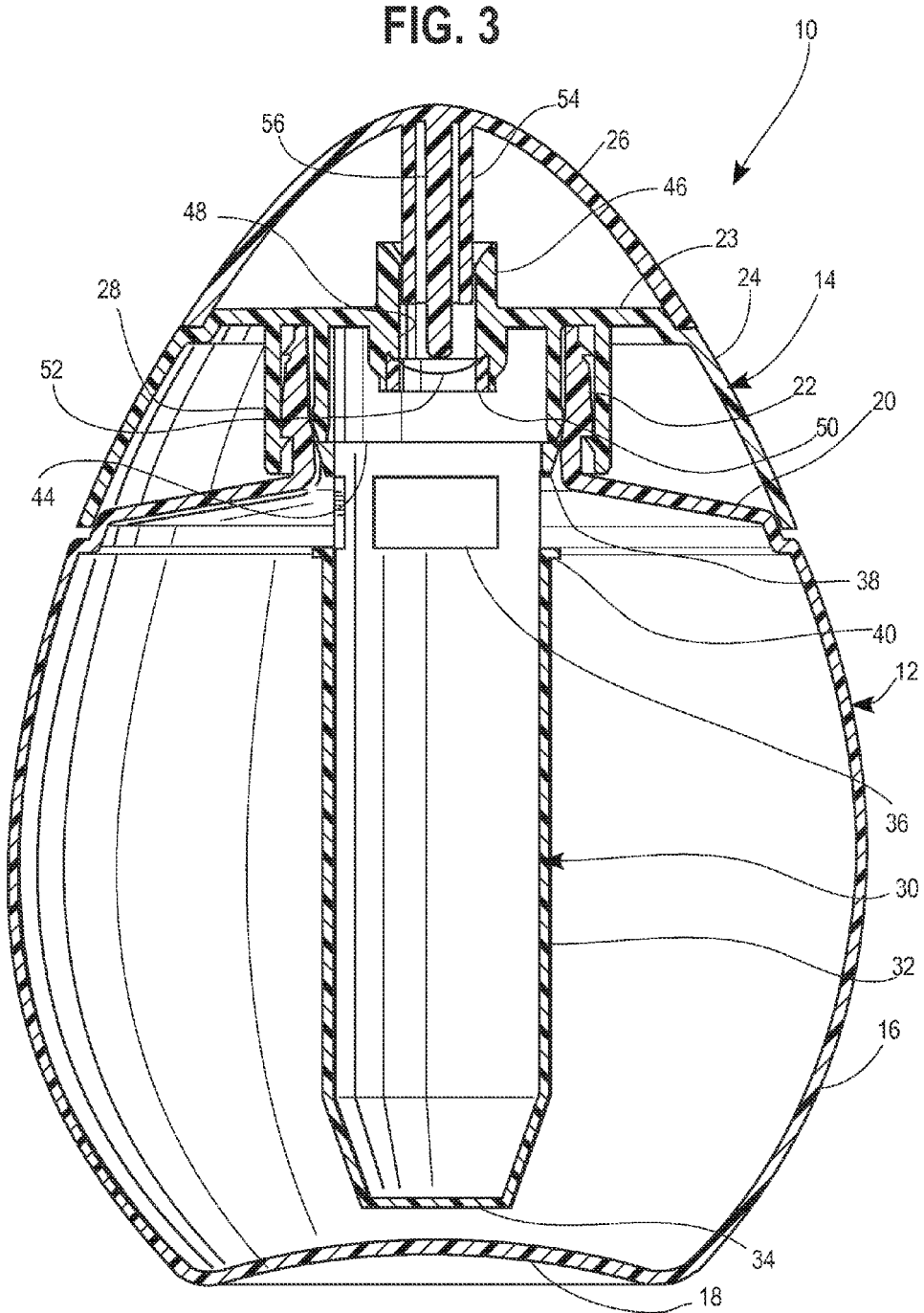
FIG. 3 is a section view similar to that of FIG. 2, but showing the body, cap, lid and inner cartridge in a mixed configuration whereby the cartridge is in fluid communication with the body.

The container 10 includes a body 12 with a cap 14 attached to the top, as illustrated in the exemplary embodiment of FIG. 1. Positioned beneath the underside of the cap 14 is a cartridge 30, as illustrated in FIGS. 2 and 3. The body 12 includes a first fluid 90 and the cartridge 30 contains a second fluid 92. Initially, the first and second fluids 90 and 92 are maintained separately. However, when it is desirable to begin consumption, the cartridge 30 is moved into a position relative to the body 12 whereby the second beverage component 92 can exit the cartridge 30 and mix with the first beverage component 90 in the body 12 of the container 10 to form the beverage concentrate 94.

Figure 14:
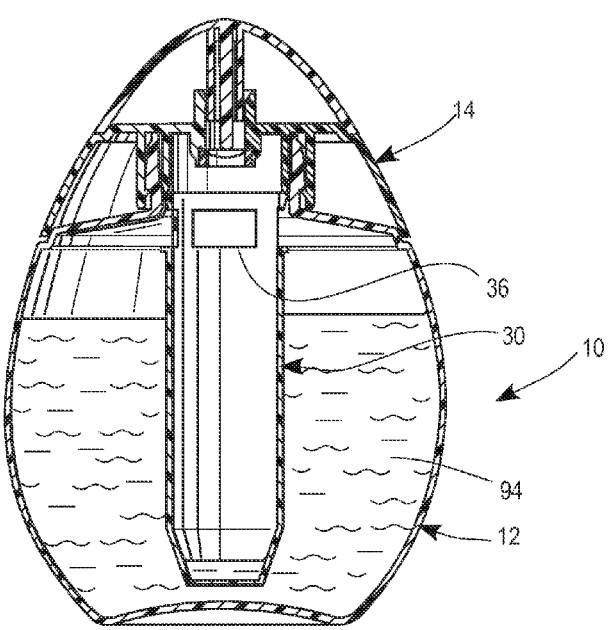
FIG. 14 is a section view similar to that of FIG. 12, but showing the container upright with the first and second beverage components having mixed in the body to form the beverage concentrate.
Figure 15:
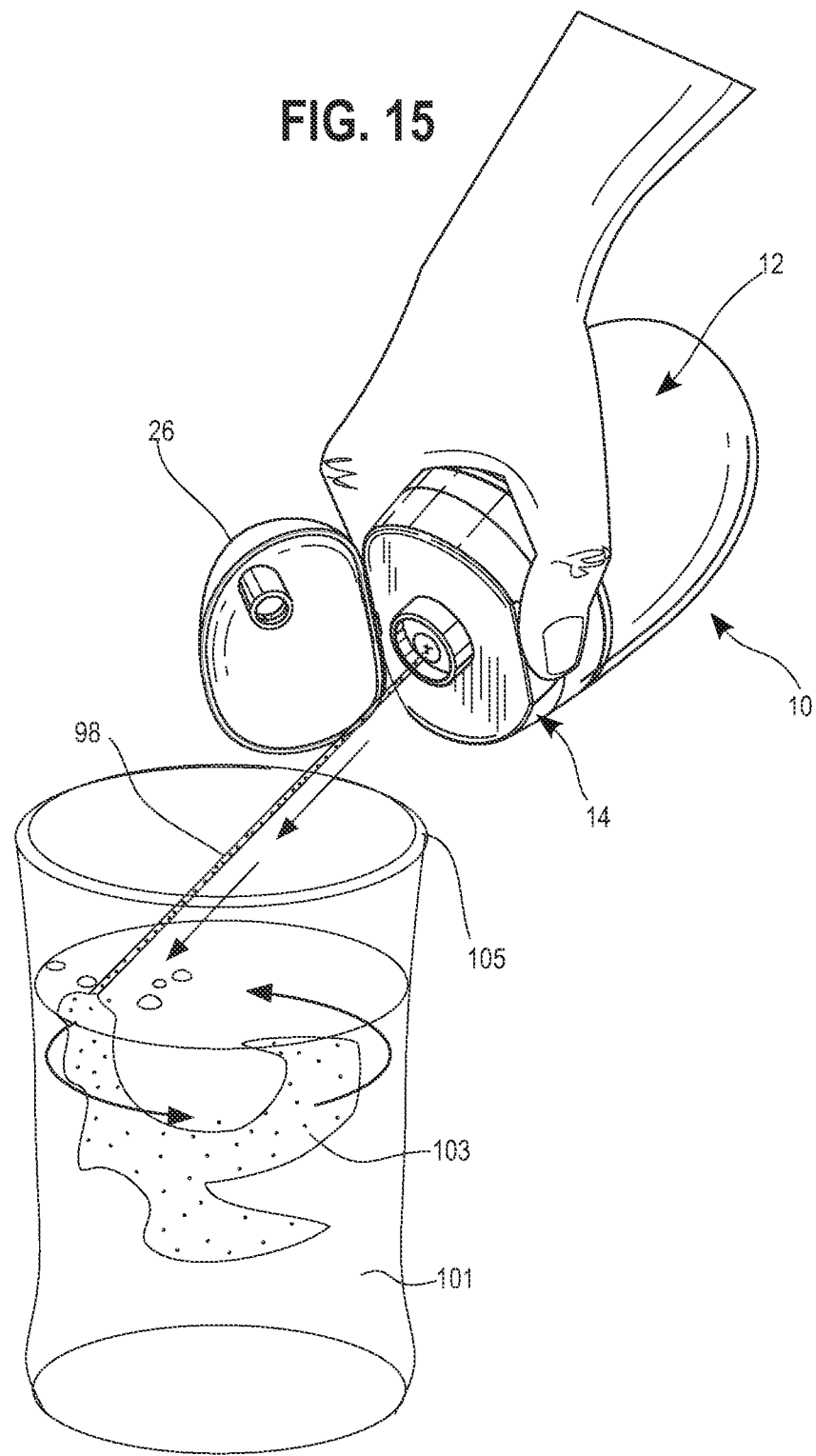
FIG. 15 is a perspective view of the container of FIG. 14 containing the beverage concentrate, with the body being squeezed to dispense the beverage concentrate as a jet into a glass of water.
Figure 16:
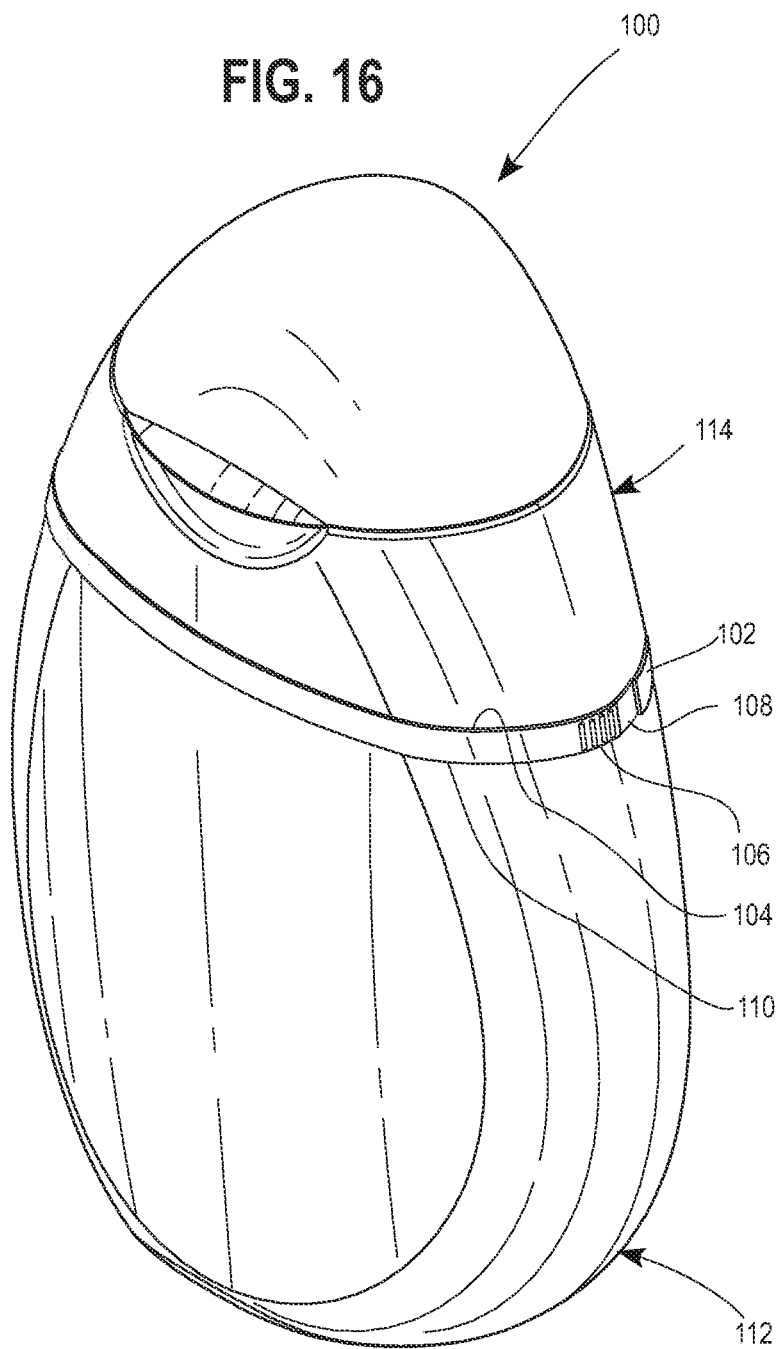
FIG. 16 is perspective view of an alternative embodiment of a container for dispensing beverage concentrates, similar to that of FIG. 1 but having a removable band that restricts axial movement of the cap and thus the cartridge until the band has been removed.

In the unmixed configuration, illustrated in FIGS. 1, 2, 4 and 11, the cartridge 30 is held at a position relative to a neck 22 of the body 12 so that flow from the cartridge 30 to the remainder of the body 12 is restricted or blocked by engagement between a portion of the cartridge 30 and the neck 22 of the body 12. However, in the mixed configuration, illustrated in FIGS. 3, 5 and 12-14, the cartridge 30 is moved so that flow from the cartridge to the reminder of the body is no longer restricted or blocked by engagement between a portion of the cartridge 30 and the neck 22 of the body 12. Accordingly, the first and second beverage components 90 and 92 can be initially kept separated, but then the cartridge 30 can be moved relative to the body 12 of the container to permit the first and second beverage components 90 and 92 to be combined or mixed to form the beverage concentrate 94. The beverage concentrate 94 can then be dispensed into water or other liquid, as illustrated in FIG. 15, to form a beverage. Exemplary beverage concentrates are disclosed in U.S. Pat. Appl. No. 61/320,155, filed Apr. 1, 2010, which is hereby incorporated by reference in its entirety.

Turning to details of the container 10, and with reference to FIGS. 2 and 3, the body 12 is enclosed by a bottom wall 18, an opposite shoulder 20 at the top portion of the body 12 and a sidewall 16 extending between the shoulder 20 and the bottom wall 18. A neck 22 extends upward from the shoulder 20 opposite the bottom wall 18 and defines an opening into an interior of the body 12. The neck 22 includes structure for mounting of the cap 14 and for supporting the cartridge 30 in both the unmixed and mixed configurations, as will be described in greater detail herein.

Figure 6:
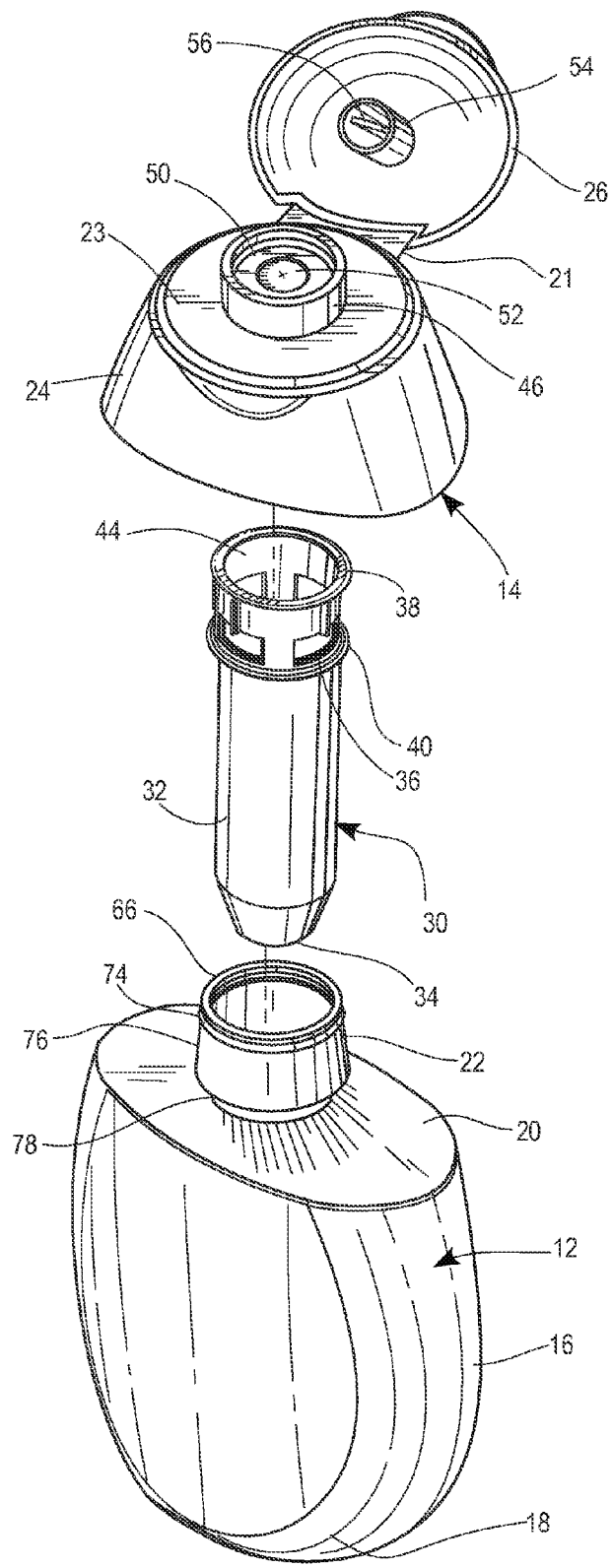
FIG. 6 is an exploded view of the container of FIG. 1, showing the body, cartridge and cap with lid.

The cap 14 is attached to the neck 22 of the body 12 of the container 10. The cap 14 includes a top wall 23, as illustrated in FIG. 6, with a depending skirt about its periphery. A raised, cylindrical spout 46 defines an opening 48 extending through the top wall 23. A lid 26 of the cap 14 is generally dome shaped and configured to cover the spout 46. In the illustrated form, the lid 26 is pivotably connected to the remainder of the cap 24 by a hinge 21, as illustrated in FIG. 6.

In one form, the lid 26 can be configured to snap fit with the remainder of the cap 14. In this form, a recessed portion 25 can be provided in the skirt 24 configured to be adjacent the lid 26 when the lid 26 is pivoted to a closed position. The recessed portion 25 can then facilitate access to a projecting ledge 27 of the lid 26 so that a user can manipulate the ledge 27 to open the lid 26.

Received within the opening 48 of the spout 46 and held in place by the cylinder 46 is a flap valve 50. The flap valve 50 has a flexible membrane or plate 52 with a plurality of slits therein, and preferably two intersecting slits forming four generally triangular flaps, as illustrated in FIG. 10. So configured, when the container 10 is squeezed, such as by depressing opposing portions of the sidewall 16 toward each other, the liquid beverage concentrate 94 is forced against the membrane 52 which outwardly displaces the flaps to allow the liquid beverage concentrate 94 to flow therethrough in a jet 98. In one aspect, the jet 98 of liquid beverage concentrate preferably combines velocity and mass flow to impact a target liquid 101 within a target container 105 to cause turbulence in the target liquid 101 and create a generally uniform mixed end product 103 without the use the extraneous utensils or shaking.

The lid 26 may further include a stopper 54 projecting from an interior surface of the lid 26. Preferably, the stopper 54 is sized to snugly fit within the spout 46, as illustrated in FIGS. 2 and 3, to provide additional protection against unintended dispensing of the liquid beverage concentrate 94 or other leakage. The stopper 54 can be a hollow, cylindrical projection, as illustrated in FIG. 6. An optional inner plug 56 can be disposed within the stopper 54 and project further therefrom, and can contact the membrane 52 of the flap valve 50 disposed in the opening 48 of the spout 46. More specifically, the inner plug 56 can restrict movement of the flaps of the flap valve 50 from a concave orientation, whereby they are closed, to a convex orientation, whereby the flaps are at least partially open for dispensing. The stopper 54 can be configured to cooperate with the spout 46 to provide one, two or more audible and/or tactile responses to a user during closing. For example, sliding movement of the rearward portion of the stopper 54 past the rearward portion of the spout 46—closer to the hinge—can result in an audible and tactile response as the lid 26 is moved toward a closed position. Further movement of the lid 26 toward its closed position can result in a second audible and tactile response as the forward portion of the stopper 54 slides past a forward portion of the spout 46—on an opposite side of the respective rearward portions from the hinge. Preferably the second audible and tactile response occurs just prior to the lid 26 being fully closed. This can provide audible and/or tactile feedback to the user that the lid 26 is closed.

The cartridge 30 is configured to contain the second beverage component 92 when the cartridge 30 is in its unmixed configuration. When the cartridge 30 is in its mixed configuration, the second beverage component 92 can exit the cartridge 30 through one or more flow ports 36 and flow into the body 12 of the container 10 to mix with the first beverage component 90 to form the beverage concentrated 94.

The cartridge 30 has a bottom wall 34 and a sidewall 32 extending upwardly therefrom to an open top end 44, as illustrated in FIGS. 7-9. The top portion of the sidewall 32, opposite the bottom wall 34, includes the one or more flow ports 36. In the exemplary embodiment, the cartridge 30 is generally cylindrical; however, other suitable shapes can be used. A ring 40 is disposed about the periphery of the sidewall 32 below the flow ports 36, i.e., between the flow ports 36 and the bottom wall 34 of the cartridge 30, and protrudes outwardly from the sidewall 32. In use, the ring 40 abuts an interior surface of the neck 22 of the body 12 of the container 10 to restrict or, more preferably, block or at least substantially block fluid flow therepast when the cartridge 30 is in its unmixed configuration, illustrated in FIGS. 2 and 4. However, when the cartridge 30 is moved further toward the bottom wall 18 of the body 12, the ring 40 reaches a point where it no longer engages the interior surface of the neck 22, thereby permitting fluid flow therepast in the mixed configuration.

In the mixed configuration, a fluid path for the introduction of contents of the cartridge 30 into the contents of the body 12 extends from the interior of the cartridge 30, through the flow ports 36 of the cartridge 30 to at least some of the space between the upper portion of the cartridge 30 and the adjacent inner surface of the neck 22 of the body 12, and then from that space past the ring 40 and into the interior of the body 12. This path from the cartridge 30 into the interior of the body 12 is blocked in the unmixed configuration. A fluid path for the dispensing of contents from the interior of the body 12 of the container 10 and through the spout 46 of the cap 14 extends past the ring 40 of the cartridge 30, between at least some of the space between the upper portion of the cartridge 30 and the adjacent inner surface of the neck 22 of the body 12, into the flow ports 36 of the cartridge 30 and then out of the cartridge 30 through the open top 44.

A ramp 38 is disposed about the periphery of the sidewall 32 of the cartridge 30 and protrudes outwardly therefrom, but is on an opposite side of the flow ports 36 from the ring 40. The ramp 38 of the cartridge is configured to frictionally engage a reduced-diameter inner surface of the neck 22 of the body 12 when in the mixing configuration to limit further movement of the cartridge 30 into the interior of the body 12, as illustrated in FIG. 5. However, when cartridge 30 is in its unmixed configuration, illustrated in FIG. 4, further spaced from the bottom wall 18 of the body 12 than in the mixed configuration, the ramp 38 is positioned adjacent a comparatively enlarged-diameter inner surface of the neck of the body 12. In this position, it is the aforementioned ring 40 of the cartridge 30 that frictionally engages the inner surface of the neck 22 to restrict movement of the cartridge 30 into the interior of the body 12.

Figure 11:
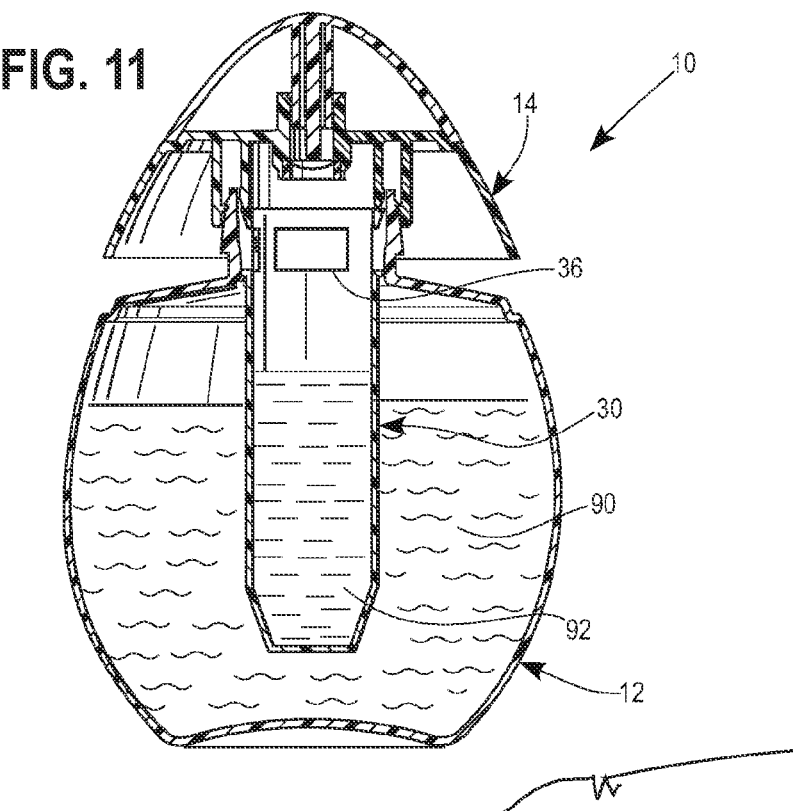
FIG. 11 is a section view of the container of FIG. 1, similar to that of FIG. 2 but showing the first beverage component in the body and the second beverage component in the cartridge, showing the cartridge in the unmixed configuration.
Figure 12:
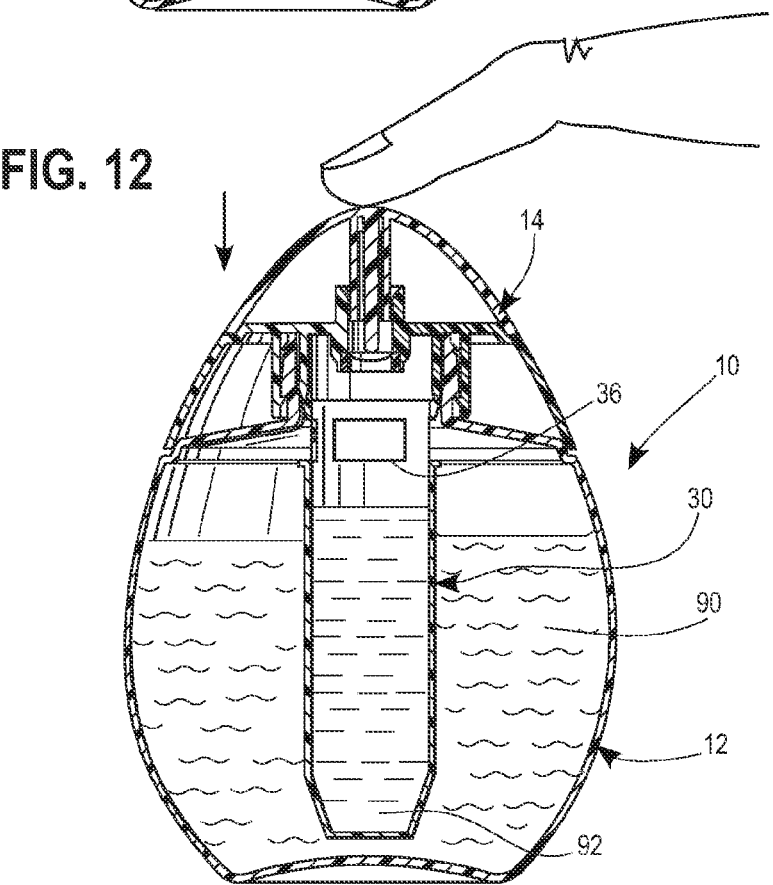
FIG. 12 is a section view similar to that of FIG. 11, but showing the cap be depressed to move the cartridge further into the body of the container to the mixed configuration.

The neck 22 of the body 12 of the container 10 includes structure for mounting of the cap 14 in positions corresponding to both the unmixed and mixed configurations of the cartridge 30, as mentioned above. In a first, initial position of the cap 14, corresponding to the unmixed configuration of the cartridge 30, the cap 14 is retained in a position spaced from the shoulder 20 at the top of the body 12 of the container 10 by engagement between the cap 14 and the neck 22, as illustrated in FIG. 11. The cartridge 30 is in its unmixed position in this position of the cap 14. The cap 14 can then be moved to a second position, toward the shoulder 20 of the body 12 of the container 10, as illustrated in FIG. 12. Movement of the cap 14 from its first position to its second position causes the cartridge 30 to move from the unmixed configuration to the mixed configuration, as will be explained in further detail herein. The cap 14 is retained in its second position by engagement between the cap 14 and the neck 22, as illustrated in FIG. 12. However, should the cap 14 be moved back toward its first position, the cartridge 30 will not move with it, instead remaining in the mixed configuration.

The cap 14 has an outer, generally cylindrical flange 28 depending from the top wall 23 that is configured to engage the outer surface of the neck 22. The outer surface of the neck 22 includes, adjacent its open upper end, a downwardly inclined circumferential upper ramp 66, as illustrated in FIGS. 2-6. Disposed below the upper ramp 66 is a circumferential upper groove or indentation 68, followed by a downwardly inclined intermediate ramp 74 followed by a lower ramp 76, the later of which terminates in a circumferential lower groove or indentation 78. The intermediate ramp 74 is shorter and has a sharper incline as compared to the lower ramp 76. The distal portion of the outer flange 28 of the cap 14 includes a circumferential, inwardly extending cap ramp 64 with a circumferential cap recess 62 thereabove.

The cap 14 also includes an inner, generally cylindrical flange 60 depending from the top wall 23. The inner flange 60 is disposed inwardly from the outer flange 28, and extends downwardly a shorter distance from the bottom wall 23 of the cap 14. The spacing between the inner and outer flanges 60 and 28 is selected so that the upstanding, generally cylindrical neck 22 of the body 12 of the container 10 is received therebetween in a manner permitting relative axial movement. The purpose of the inner flange 60 is to force the cartridge 30 from the unmixed configuration to the mixed configuration. This is accomplished by having the distal end of the inner flange abut the top of the cartridge 30, such as the upper portion of the ring 40, when the cap 14 is moved from its first position to its second position. Movement of the cap from its first position to its second position causes the distal end of the inner flange to abut the top of the cartridge 30 and push the cartridge 30 into the mixed configuration. Further movement of the cap 14, and thus the cartridge 30, is limited by abutment of the upper portion of the neck 22 with the portion of the bottom wall 23 of the cap 14 disposed between the inner and outer flanges 60 and 28.

The cap ramp 64 and cap recess 62 of the outer flange 28 of the cap 14 cooperate with the outer surface of the neck 22 to retain the cap 14 in either its first position or its second position relative to the body 12 of the container 10. The use of the term retain does not mean that it is impossible to move from a given position; rather that there is some force that must be overcome in order to do so. In order to attach the cap 14 to the neck 22, the cap ramp 64 slides along the upper ramp 66 of the neck 22, with the neck 22 and/or the outer flange 28 of the cap 14 flexing away from each other until the ledges of the respective cap groove 62 and upper neck groove 68 interlock to restrict outward removal, as illustrated in FIGS. 2 and 4.

In the first position, illustrated in FIGS. 2 and 4, the cap ramp 64 of the outer flange 28 of the cap is received within the upper groove 68 of the neck 22 of the body 12 of the container. The cap 14 in this first position is retained against removal by engagement between a generally radially extending ledge bounding the lower portion of the cap recess 62 and a generally radially extending ledge bounding the upper portion of the upper groove 68 of the neck 22 of the body 12 of the container 10. The cap 14 in this first position is also retained against being moved toward the second position, i.e., toward the shoulder 20 of the body 12 of the container 10, by engagement between the downwardly inclined intermediate ramp 74 of the neck 22 and the downwardly inclined cap ramp 64. Any of the ramps and flanges discussed herein can be either continuous or discontinuous, other than the structure of the cartridge 30 that forms the seal in the unmixed configuration.

As mentioned above, the cap 14 is depressed toward the shoulder 20 of the body 12 to move from the first position to the second position. This causes the outer flange 28 of the cap 14 and/or the neck 22 to flex away from each other as the cap ramp 64 rides along the increasing diameter of the intermediate and lower ramps 74 and 76 of the neck 22 until which point the ledge of the cap groove 62 can snap into the lower groove 78 of the neck 22, as illustrated in FIGS. 3 and 5. Now in the second position, the cap 14 is restricted from moving back toward the first position by engagement between the ledge of the cap groove 62 and a generally radially extending ledge forming an upper boundary of the lower groove 78 of the neck 22. As described above, initial movement of the cap from the first position to the second position causes the inner flange 60 of the cap 14 to push the cartridge 30 from the unmixed position to the mixed position, whereby fluid from within the cartridge 30 can flow into the interior of the body 12 of the container 10.

Figure 13:
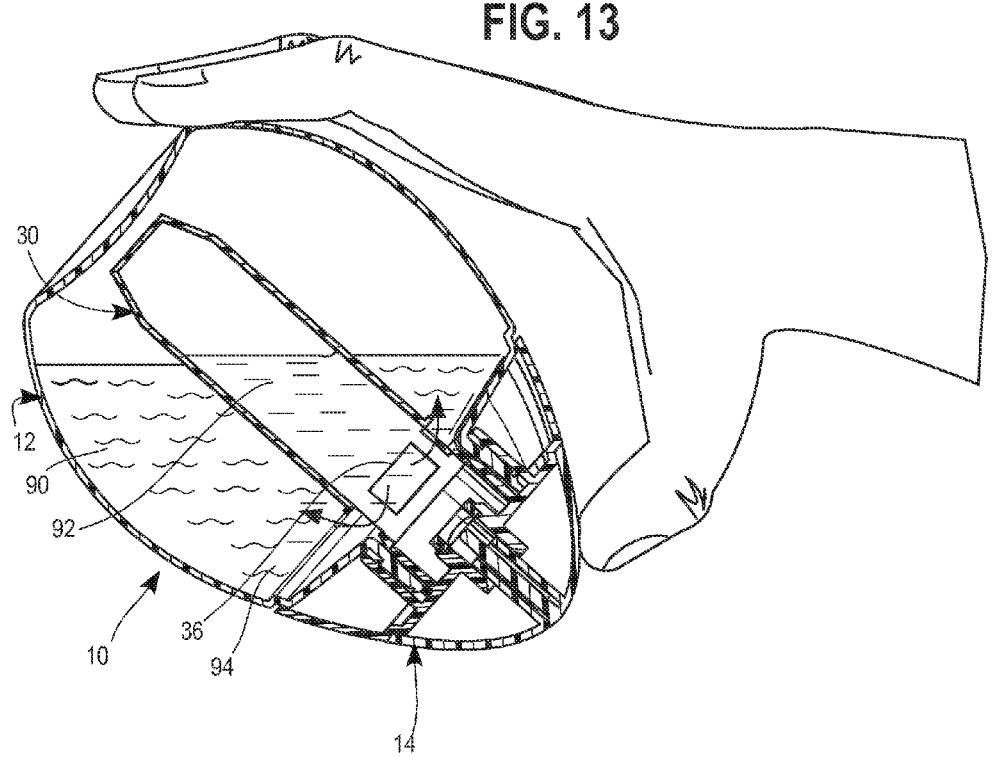
FIG. 13 is a section view similar to that of FIG. 12, but showing the container being inverted to permit the second beverage component to exit the cartridge and mix in the body with the first beverage component.

In order to mix the contents 92 of the cartridge 30 with the contents 90 of the interior of the body 12 of the container 10, the cap 14 is moved from its first position, illustrated in FIG. 11, to its second position, illustrated in FIG. 12. This initially will cause the cartridge 30 to move from the unmixed position, whereby a flow path from the cartridge 30 to the body 12 is blocked, to the mixed position, whereby the flow path is unblocked. The container 10 can then be inverted an amount sufficient to permit the contents 92 of the cartridge 30 to exit the flow ports 36 and into the body 12 to mix with the contents 90 thereof, as illustrated in FIG. 13. The container 10 is then ready for dispensing the beverage concentrate 94, as illustrated in FIG. 14, when inverted with the flow going through the flow ports 36 of the cartridge 30, through the open top of the cartridge 30, and finally through the valve 50 of the spout 46 of the cap 14. Advantageously, the contents 90 of the container 10 move through the cartridge 30 during dispensing, further aiding mixing with the contents 92 of the cartridge 30. The resulting jet 98 can then be directed into a target liquid 101 within a target container 105 to cause turbulence in the target liquid 101 and create a generally uniform mixed end product 103, as illustrated in FIG. 15, without the use the extraneous utensils or shaking.

Additional structure can optionally be provided to further retain the cap 14 against movement from the first position to the second position. In the exemplary embodiment of the alternative container 100 illustrated in FIG. 16, the alternative container 100 is the same as the container 10 described above, except for the addition of a removable band 102. That is, the container 100 includes a cap 114 and a body 112. While the body 112 is the same as discussed above, the cap 114 includes the removable band 102 attached to its lower periphery substantially about the outer skirt thereof. The band 102 is attached at its upper edge 104 to the outer skirt of the cap 114 via an area of weakness, such as a thinned line. The opposite, lower edge 110 is positioned to abut the shoulder of the body 112 of the container 110, thereby acting as a physical impediment to movement of the cap 114 from the first position to the second position. Preferably, the width of the removable band 102 is greater than the span between the upper and lower grooves 68 and 78 of the neck such that the cap 114 is restricted by the band 102 from being moved from the first position to the second position. Ends of the band 102 may be spaced from each other by an access gap 108, with one of the ends of the band 102 having one or more protruding ribs 106 for providing gripping surfaces to initiate removal of the band 102. Once the band 102 is removed, the cap 114 can be depressed toward the shoulder of the body 112 of the container 110, as described above. Alone or in combination with this band 102, a shrink wrapped film extending into the gap between the cap 14 or 114 and the body 12 or 112 can be used to restrict and/or indicate whether the cap 14 or 114 has been depressed.

The containers described herein may have resilient sidewalls that permit them to be squeezed to dispense the liquid concentrate or other contents. By resilient, what is meant that they return, to or at least substantially return to their original configuration when no longer squeezed. Further, the containers may be provided with structural limiters for limiting displacement of the sidewall, i.e., the degree to which the sidewalls can be squeezed. This can advantageous contribute to the consistency of the discharge of contents from the containers. For example, the cartridge can function as a limiter when the opposing portions of the sidewall contact it, particularly when the cartridge is less resilient or much or rigid than the container body. The depth and/or cross-section of the cartridge can be varied to provide the desired degree of limiting. Other structural protuberances of one or both sidewalls (such as opposing depressions or protuberances) can function as limiters, as can structural inserts.

Set forth in the below examples are results based upon testing of the container 10 without the cartridge 30, as set forth in U.S. Pat. Appl. No. 61/374,178, filed Aug. 16, 2010, which is hereby incorporated by reference in its entirety. It is believed that the addition of the cartridge will not substantially alter these results.

EXAMPLES

Tests were performed using a variety of nozzles as the discharge opening in a container made from high-density polyethylene (HDPE) and ethylene vinyl alcohol (EVOH)

with a capacity of approximately 60 cc. Table 1 below shows the nozzles tested and the abbreviation used for each

TABLE 1

Nozzles Tested

| Long Name | Abbreviation |
|---|---|
| SLA Square Edge Orifice 0.015" | O_015 |
| SLA Square Edge Orifice 0.020" | O_020 |
| SLA Square Edge Orifice 0.025" | O_025 |
| LMS V21 Engine 0.070" × Slit | V21_070 |
| LMS V21 Engine 0.100" × Slit | V21_100 |
| LMS V21 Engine 0.145" × Slit | V21_145 |
| LMS V21 Engine 0.200" × Slit | V21_200 |

The SLA Square Edge Orifice nozzles each have a front plate with a straight-edged circular opening therethrough, and were made using stereolithography. The number following the opening identification is the approximate diameter of the opening. The LMS refers to a silicone valve disposed in a nozzle having an X shaped slit therethrough, and are available from Liquid Molding Systems, Inc. ("LMS") of Midland, Mich. The slit is designed to flex to allow product to be dispensed from the container and at least partially return to its original position to seal against unwanted flow of the liquid through the valve. This advantageously protects against dripping of the liquid stored in the container, which is important for liquid concentrates, as discussed above. The number following is the approximate length of each segment of the X slit.

An important feature for the nozzle is the ability to mix the dispelled liquid concentrate with the target liquid, usually water, using only the force created by spraying the liquid concentrate into the water. Acidity (pH) levels can be utilized to evaluate how well two liquids have been mixed. For example, a liquid concentrate poured from a cup leaves distinct dark and light bands. A jet of the liquid concentrate, however, tends to shoot to the bottom of the target container and then swirl back up to the top of the target liquid, which greatly reduces the color difference between the bands. Advantageously, pH levels can also be utilized in real time to determine mixture composition. Testing included dispensing 4 cc of liquid concentrate in 500 ml of DI $H_2O$ at room temperature of 25 degree Celsius. The pour was done from a small shot glass, while the jet was produced by a 6 cc syringe with an approximately 0.050 inch opening. Mixing refers to a Magnastir mixer until steady state was achieved.

After forty seconds, the pour produces results of 3.28 on the bottom and 4.25 on the top in the first rep and 3.10 and 4.70 on the top in the second rep. The Jet, however, was tested using a slow, a medium, and a fast dispense. After forty seconds, the slow dispense resulted in a 3.07 on the bottom and a 3.17 on the top, the medium dispense resulted in a 3.06 on the bottom and a 3.17 on the top, and the fast dispense resulted in a 2.71 on the bottom and a 2.70 on the top. Accordingly, these results show the effectiveness of utilizing a jet of liquid concentrate to mix the liquid concentrate with the target liquid. An effective jet of liquid concentrate can therefore provide a mixture having a variance of pH between the to and the bottom of a container of approximately 0.3. In fact, this result was achieved within 10 seconds of dispense.

Accordingly, each nozzle was tested to determine a Mixing Ability Value. The Mixing Ability Value is a visual test measured on a scale of 1-4 where 1 is excellent, 2 is good, 3 is fair, and 4 is poor. Poor coincides with a container having unmixed layers of liquid, i.e., a water layer resting on the liquid concentrate layer, or an otherwise unoperable nozzle. Fair coincides with a container having a small amount of mixing between the water and the liquid concentrate, but ultimately having distinct layers of liquid concentrate and water, or the nozzle operates poorly for some reason. Good coincides with a container having desirable mixing over more than half of the container while also having small layers of water and liquid concentrate on either side of the mixed liquid. Excellent coincides with a desirable and well mixed liquid with no significant, readily-identifiable separation of layers of liquid concentrate or water.

The test dispensed 4 cc of liquid concentrate, Which was 125 g citric acid in 500 g H20 5% SN949603 (Flavor) and Blue #2 1.09 g/cc, into a glass 250 ml Beaker having 240 ml of water therein. The liquid concentrate has a viscosity of approximately 4 centipoises. Table 3 below shows the results of the mixing test and the Mixing Ability Value of each nozzle.

TABLE 3

Mixing Ability Value of each nozzle

| Nozzle | Mixing Ability Value |
|---|---|
| O_015 | 3 |
| O_020 | 2 |

TABLE 2 pH MixingData

| | Pour | | | | Jet | | | | | |
|---|---|---|---|---|---|---|---|---|---|---|
| | Rep 1 | | Rep 2 | | Slow (~1.5 s) | | Med (~1 s) | | Fast (~0.5 s) | |
| Time | Bottom | Top | Bottom | Top | Bottom | Top | Bottom | Top | Bottom | Top |
| 0 | 5.42 | 5.34 | 5.40 | 5.64 | 5.50 | 5.54 | 5.54 | 5.48 | 5.56 | 5.59 |
| 5 | 3.57 | 4.90 | 3.52 | 5.00 | 3.19 | 4.10 | 3.30 | 3.70 | 2.81 | 2.90 |
| 10 | 3.37 | 4.70 | 3.33 | 4.80 | 2.97 | 3.20 | 3.25 | 3.45 | 2.78 | 2.80 |
| 15 | 3.33 | 4.70 | 3.22 | 4.70 | 3.00 | 3.10 | 3.27 | 3.40 | 2.77 | 2.78 |
| 20 | 3.32 | 4.60 | 3.16 | 4.70 | 3.01 | 3.10 | 3.13 | 3.30 | 2.75 | 2.80 |
| 25 | 3.31 | 4.60 | 3.12 | 4.70 | 3.01 | 3.08 | 3.08 | 3.20 | 2.74 | 2.80 |
| 30 | 3.31 | 4.50 | 3.10 | 4.70 | 3.01 | 3.07 | 3.06 | 3.18 | 2.73 | 2.75 |
| 35 | 3.30 | 4.30 | 3.09 | 4.70 | 3.00 | 3.06 | 3.05 | 3.17 | 2.72 | 2.75 |
| 40 | 3.28 | 4.25 | 3.10 | 4.70 | 3.00 | 3.07 | 3.06 | 3.17 | 2.71 | 2.70 |
| Mixed | 2.78 | | 2.70 | | 2.67 | | 2.70 | | 2.65 | |

TABLE 3-continued

Mixing Ability Value of each nozzle

| Nozzle | Mixing Ability Value |
|---|---|
| O_025 | 1 |
| V21_070 | 1 |
| V21_100 | 1 |
| V21_145 | 2 |
| V21_200 | 2 |

Figure 17:
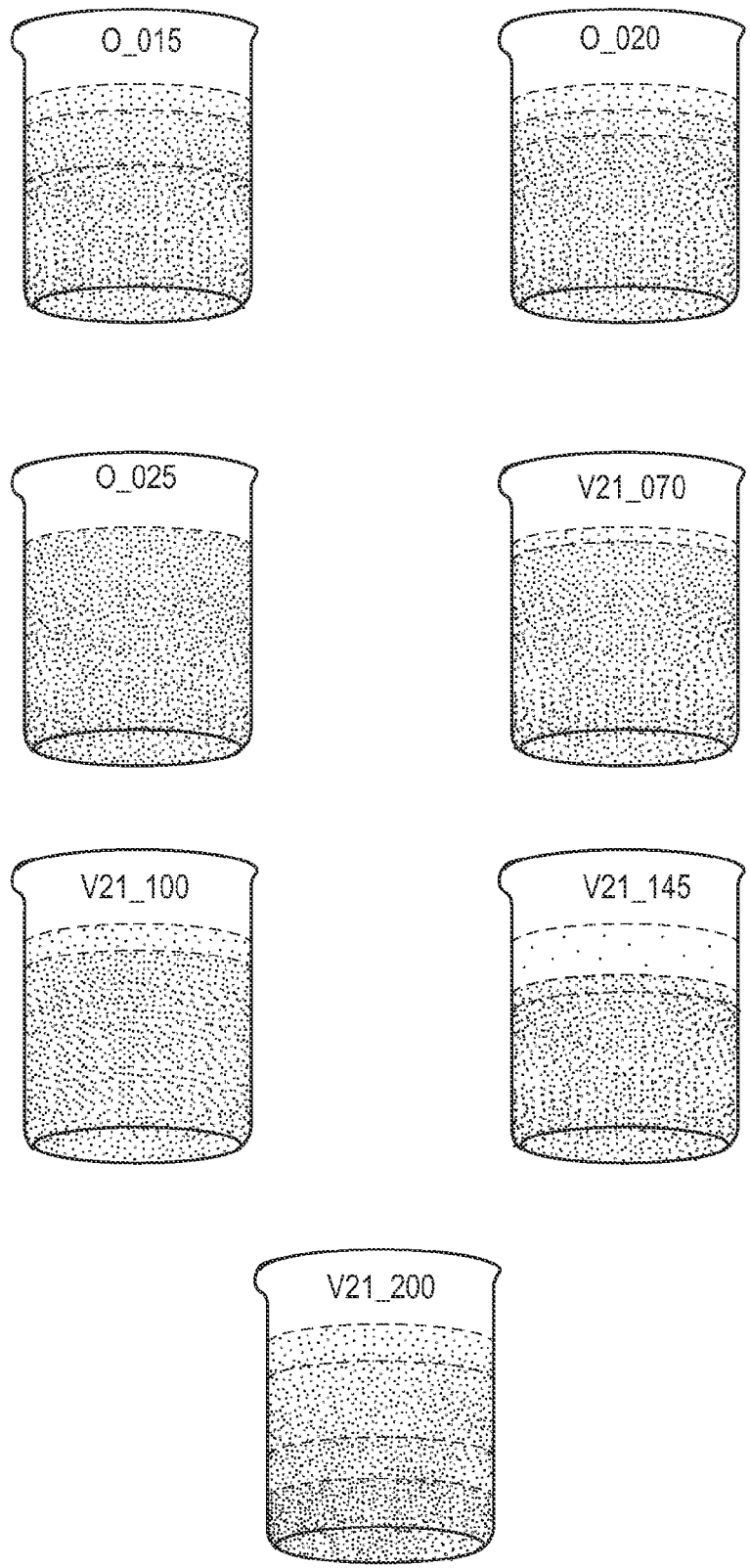
FIG. 17 is a bottom perspective of a representation of the results of the mixing ability test for tested nozzles showing beakers with varying levels of mixture.

As illustrated in FIG. 17, a representation of the resulting beaker of the mixing ability test for each tested nozzle is shown. Dashed lines have been added to indicate the approximate boundaries between readily-identifiable, separate layers. From the above table and the drawings in FIG. 17, the 0.025 inch diameter Square Edge Orifice, the 0.070 inch X Slit, and the 0.100 inch X Slit all produced mixed liquids with an excellent Mixing Ability Value where the beaker displayed a homogeneous mixture with a generally uniform color throughout. The 0.020 inch diameter Square Edge Orifice, the 0.145 inch X Slit, and the 0.200 inch X Slit produced mixed liquids with a good Mixing Ability Value, where there were small layers of water and liquid concentrate visible after the 4 cc of liquid concentrate had been dispensed. The 0.015 inch Square Edge Orifice produced a mixed liquid that would have qualified for a good Mixing Ability Value, but was given a poor Mixing Ability Value due to the amount of time it took to dispense the 4 cc of liquid concentrate, which was viewed as undesirable to a potential consumer.

As discussed above, another important feature for a nozzle utilized to dispense liquid concentrate is the amount of splashing or splatter that occurs when the liquid concentrate is dispensed into a container of liquid. The concentrated dyes within the liquid concentrate can stain surrounding surfaces, as well as the clothes and skin of the user of the container. Due to this, each nozzle was also tested for an Impact Splatter Factor. The Impact Splatter Factor test utilized a 400 ml beaker having water dyed blue filled to 1 inch from the rim of the beaker. A circular coffee filter was then secured to the beaker using a rubber band, such that the filter had a generally flat surface positioned 1 inch above the rim of the beaker. By being positioned an inch above the rim of the beaker, the coffee filter included a sidewall that when splashed indicated liquid exiting the beaker in a sideways orientation, which due to the dyes discussed above, is undesirable. The coffee filter also included a cutout extending slightly onto the upper surface so that the liquid could be dispensed into the container. A bottle having the nozzles secured thereto was then held above the perimeter of the beaker and liquid was dispensed to the center of the beaker five times. The coffee filter was subsequently removed and examined to determine the Impact Splatter Factor for each nozzle. The Impact Splatter Factor is a visual test measured on a scale of 1-4 where 1 is excellent, 2 is good, 3 is fair, and 4 is poor. Excellent coincides with a filter having no or small splashes in the center area of the filter positioned above the beaker and substantially minimal to no splashes outside of this center area. Good coincides with a filter having splashes in the center area and small splashes outside of the center area. Fair coincides with splashes in the center area and medium size splashes outside of the center area. Poor coincides with a filter having splashes in the center area and large splashes outside of the center area.

TABLE 4

Impact Splatter Factor of each nozzle

| Nozzle | Impact Splatter Factor |
|---|---|
| O_015 | 1 |
| O_020 | 1 |
| O_025 | 2 |
| V21_070 | 1 |
| V21_100 | 3 |
| V21_145 | 3 |
| V21_200 | 4 |

Figure 18:
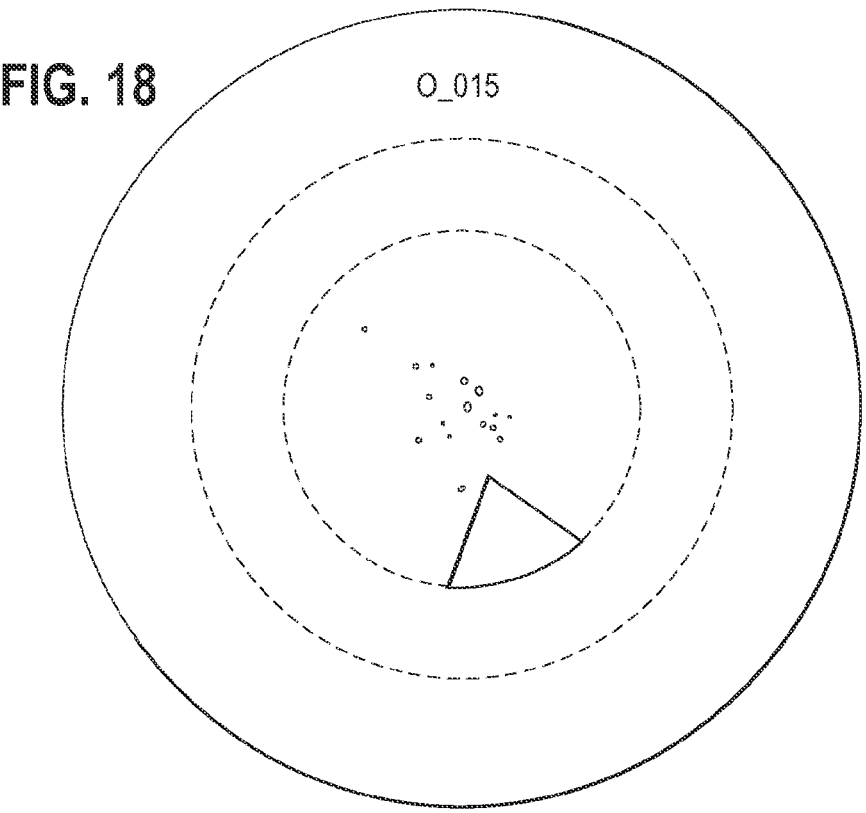
FIG. 18 is a top plan view of a representation of the results of an impact splatter test for a tested nozzle showing a coffee filter with splatter marks thereon.
Figure 19:
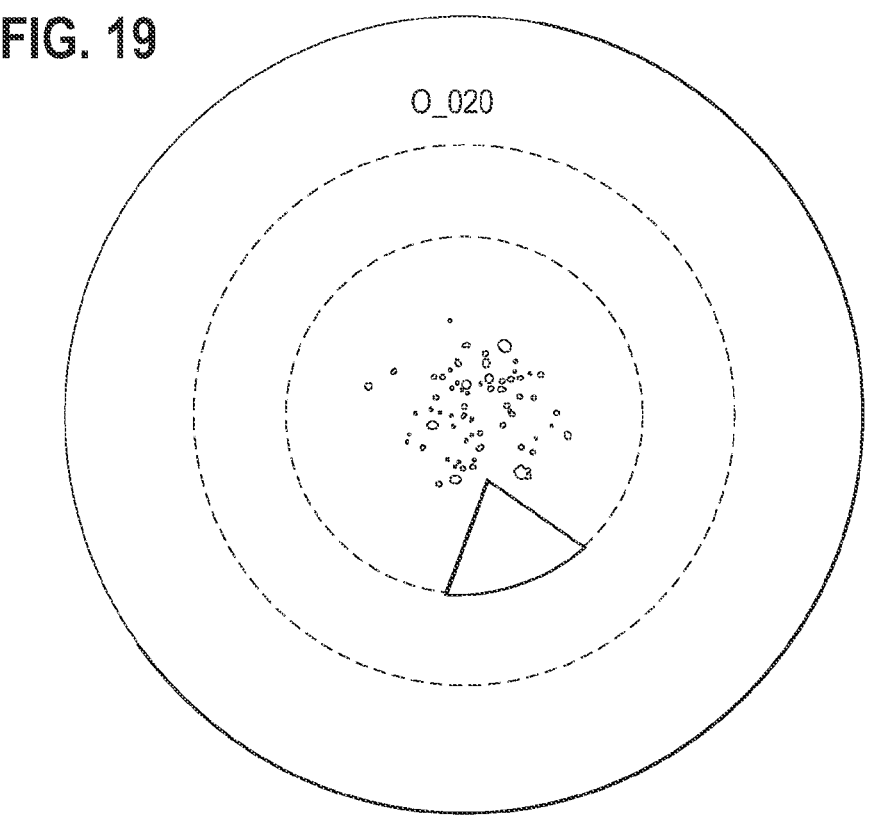
FIG. 19 is a top plan view of a representation of the results of an impact splatter test for a tested nozzle showing a coffee filter with splatter marks thereon.
Figure 20:
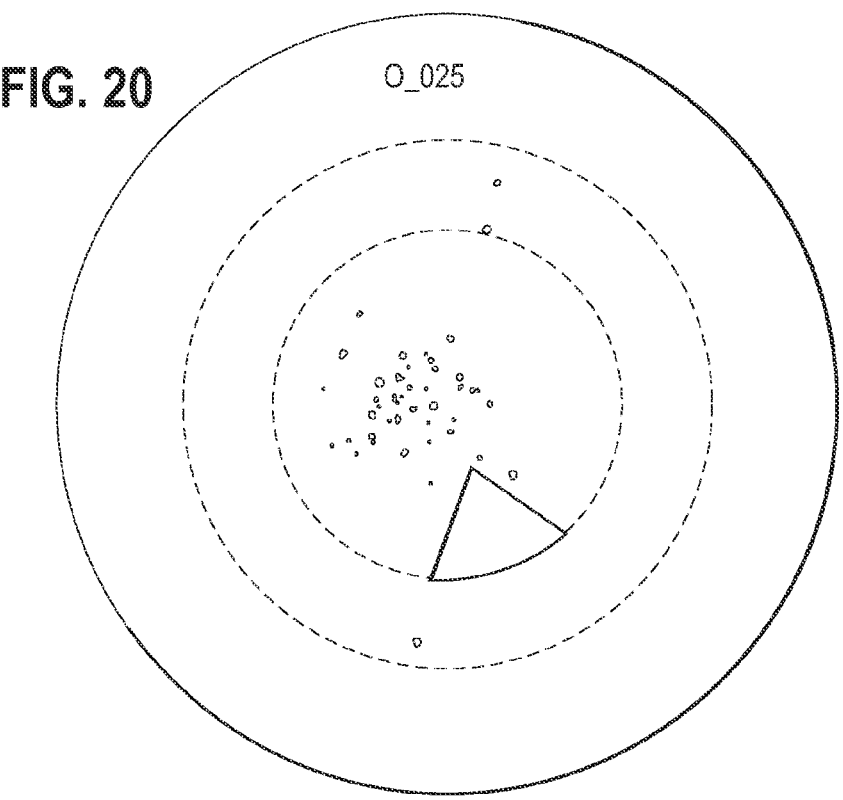
FIG. 20 is a top plan view of a representation of the results of an impact splatter test for a tested nozzle showing a coffee filter with splatter marks thereon.
Figure 21:
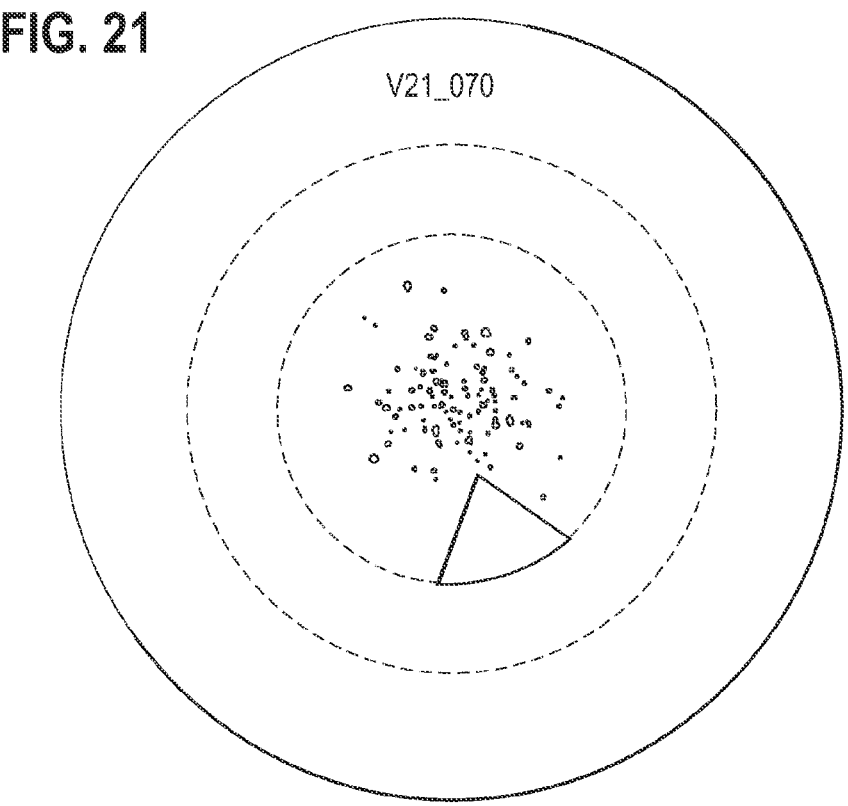
FIG. 21 is a top plan view of a representation of the results of an impact splatter test for a tested nozzle showing a coffee filter with splatter marks thereon.
Figure 22:
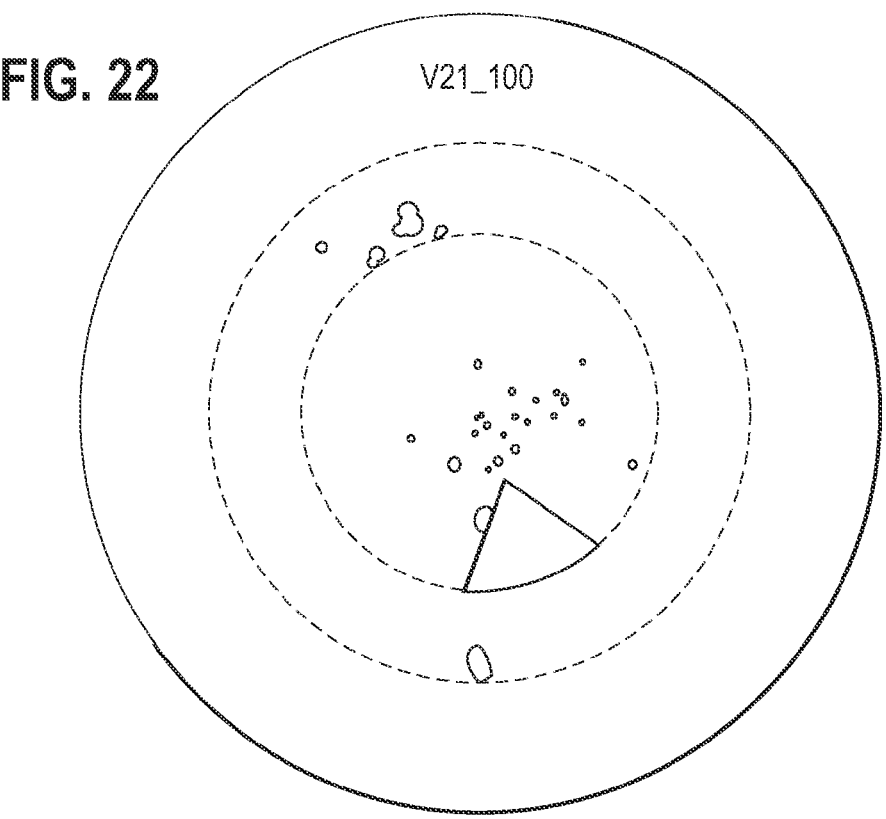
FIG. 22 is a top plan view of a representation of the results of an impact splatter test for a tested nozzle showing a coffee filter with splatter marks thereon.
Figure 23:
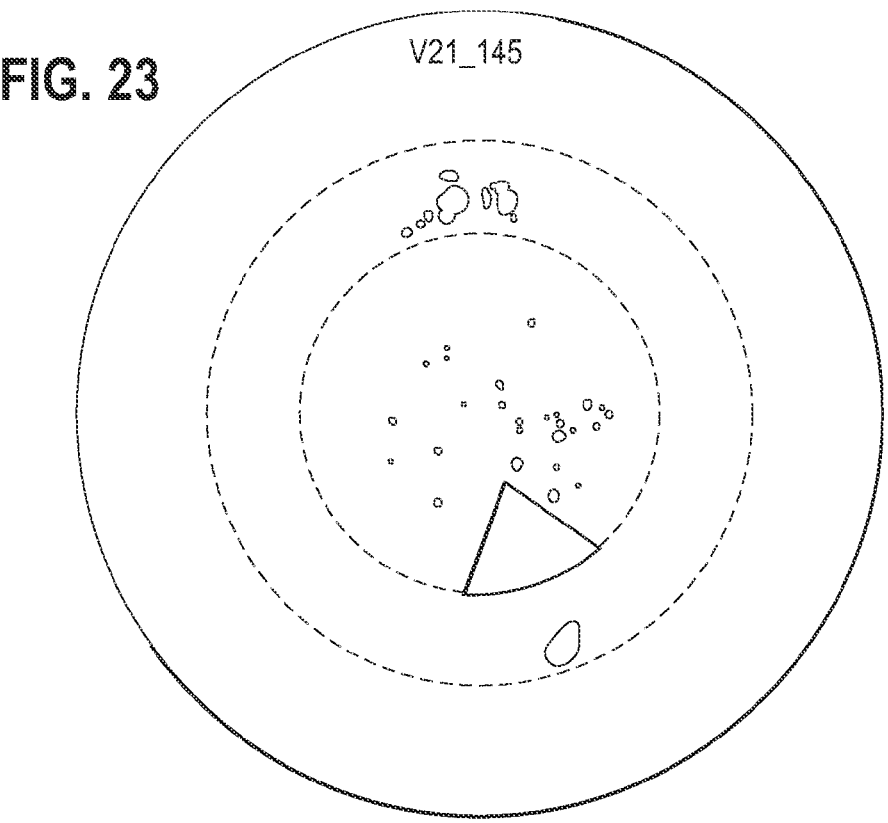
Figure 24:
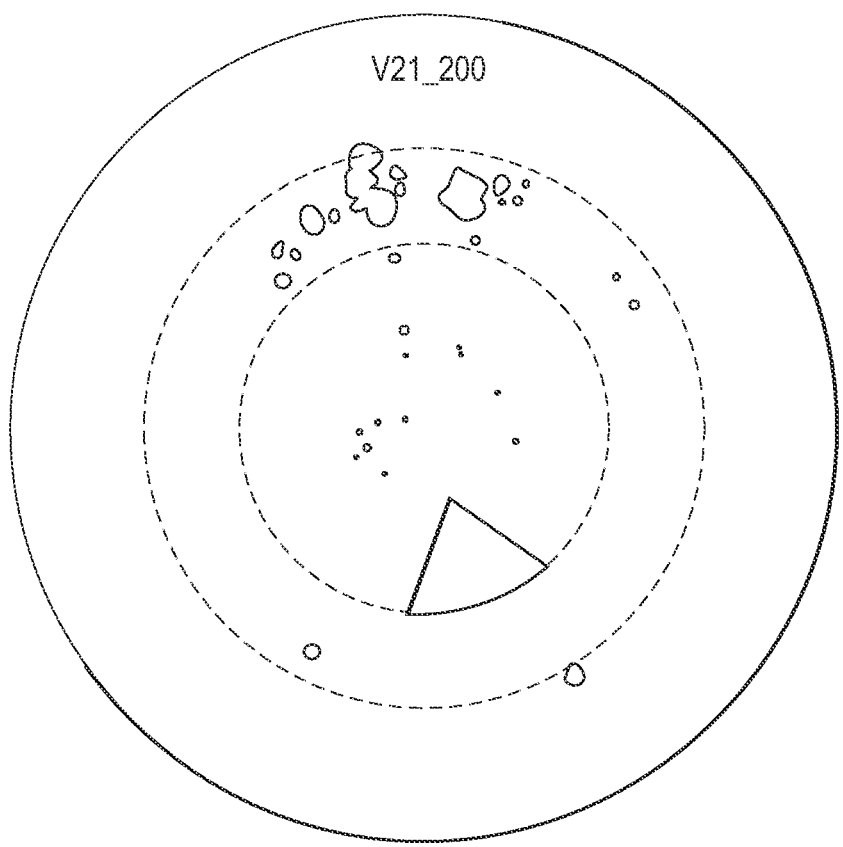
FIG. 24 is a top plan view of a representation of the results of an impact splatter test for a tested nozzle showing a coffee filter with splatter marks thereon.

As illustrated in FIGS. 18-24 and set forth in Table 4 above, Impact Splatter Factors were identified for each nozzle tested. The 0.015 inch and the 0.020 inch Square Edge Orifice, as well as the 0.070 inch X Slit nozzle received an excellent Impact Splatter Factor because the splatter created by the jet of liquid did not create substantial splatter marks on the sidewall of the coffee filter during testing, as illustrated in FIGS. 18, 19, and 21 respectively. The 0.025 inch Square Edge Orifice caused a few small splatter marks to impact the sidewall of the coffee filter as illustrated in FIG. 20 and therefore received an Impact Splatter Factor of 2. The 0.100 inch and the 0.145 inch X Slit nozzles caused large splatter marks to impact the sidewall as illustrated in FIGS. 22 and 13 and accordingly received an Impact Splatter Factor of 3. Finally, the 0.200 inch X Slit nozzle caused substantial marks on the sidewall of the coffee filter, which indicates that a large amount of liquid was forced outward from the beaker. Due to this, the 0.200 inch X Slit nozzle received an Impact Splatter Factor of 4.

Figure 25:
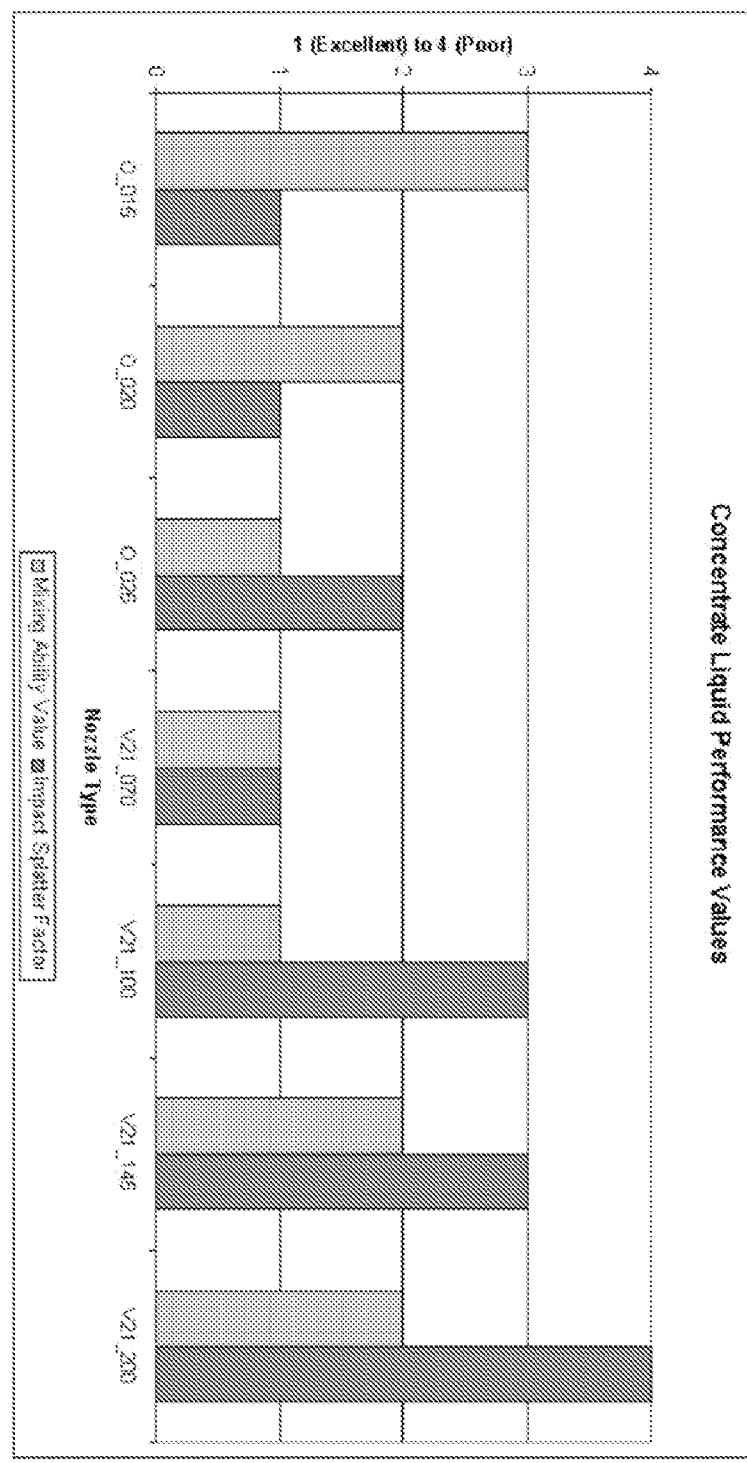
FIG. 25 is a graph showing Mixing Ability and Splash Values for tested nozzles.

FIG. 25 illustrates the Mixing Ability Values and the Impact Splatter Factors found for each of the nozzles tested. These test values can be combined to form Liquid Concentrate Dispense Performance Values for each nozzle. Through testing, the 0.070 inch X Slit was found to produce a Liquid Concentrate Dispense Performance Value of 2 by both mixing excellently while also creating minimal impact splatter. Following this, the 0.020 inch and the 0.025 inch Square Edge Orifices were both found to have a value of 3 to produce a good overall end product. The 0.015 inch Square Edge Orifice and the 0.100 inch X Slit both received a value of 4, while the 0.145 inch and the 0.200 X Slit received Values of 5 and 6 respectively. From these results, the Liquid Concentrate Dispense Performance Value for the nozzle utilized with the container described, herein should be in the range of 1-4 to produce a good product, and preferably 2-3.

The average velocity of each nozzle was then calculated using both an easy and a hard force. An easy squeeze force can be, for example, about 1.4 psi while a hard squeeze can be about 3.6 psi. For each nozzle, a bottle with water therein was positioned horizontally at a height of 7 inches from a surface. The desired force was then applied and the distance to the center of the resulting water mark was measured within 0.25 ft. Air resistance was neglected. This was performed three times for each nozzle with both forces. The averages are displayed in Table 5 below.

TABLE 5

The average velocity calculated for each nozzle using an easy force and a hard force

| Nozzle | Velocity (mm/s) (Easy) | Velocity (mm/s) (Hard) |
|---|---|---|
| O_015 | 5734 | 7867 |
| O_020 | 6000 | 8134 |
| O_025 | 6400 | 7467 |

TABLE 5-continued

The average velocity calculated for each nozzle
using an easy force and a hard force

| Nozzle | Velocity (mm/s) (Easy) | Velocity (mm/s) (Hard) |
|---|---|---|
| V21_070 | 6400 | 7467 |
| V21_100 | 5600 | 8134 |
| V21_145 | 4934 | 6134 |
| V21_200 | 4000 | 5334 |

Each nozzle was then tested to determine how many grams per second of fluid are dispensed through the nozzle for both the easy and hard forces. The force was applied for three seconds and the mass of the dispelled fluid was weighed. This value was then divided by three to find the grams dispelled per second. Table 6 below displays the results.

TABLE 6

Mass flow for easy and hard forces for each nozzle

| Nozzle | Mass Flow (g/s) (Easy) | Mass Flow (g/s) (Hard) |
|---|---|---|
| O_015 | 0.66 | 0.83 |
| O_020 | 1.24 | 1.44 |
| O_025 | 1.38 | 1.78 |
| V21_070 | 1.39 | 2.11 |
| V21_100 | 2.47 | 3.75 |
| V21_145 | 2.36 | 4.16 |
| V21_200 | 2.49 | 4.70 |

Figure 26:
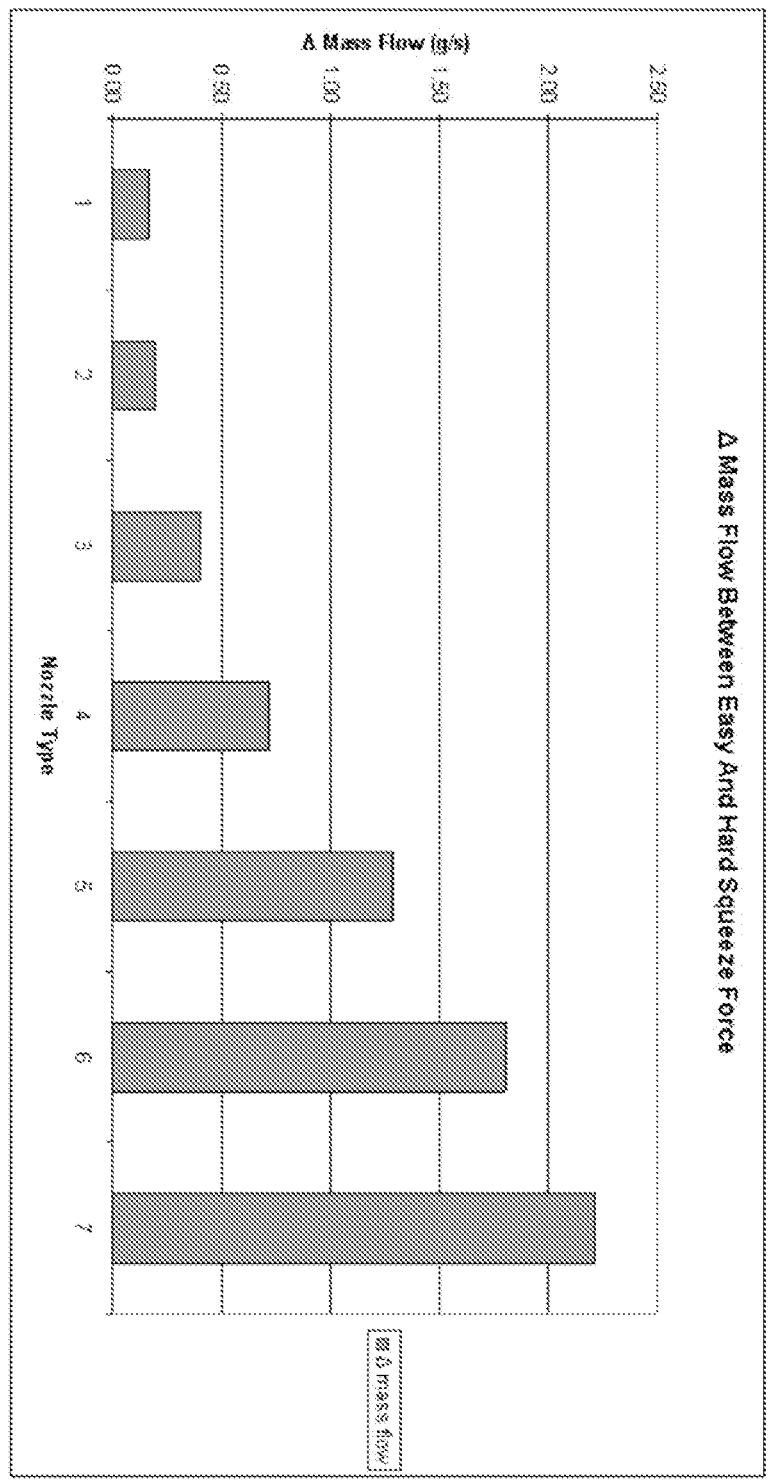
FIG. 26 is a graph showing the difference of the Mass Flow between easy and hard forces for tested nozzles.

As illustrated in FIG. 26, the graph shows the difference of the Mass Flow between the easy and hard forces for each of the nozzles. When applied to a liquid concentrate setting, a relatively small delta value for Mass Flow is desirable because this means that a consumer will dispense a generally equal amount of liquid concentrate even when differing squeeze forces are used. This advantageously supplies an approximately uniform mixture amount, which when applied in a beverage setting directly impacts taste, for equal squeeze times with differing squeeze forces. As shown, the 0.100 inch, the 0.145 inch, and the 0.200 inch X Slit openings dispense significantly more grams per second, but also have a higher difference between the easy and hard forces, making a uniform squeeze force more important when dispensing the product to produce consistent mixtures.

The mass flow for each nozzle can then be utilized to calculate the time it takes to dispense 1 cubic centimeter (cc) of liquid. The test was performed with water, which has the property of 1 gram is equal to 1 cubic centimeter. Accordingly, one divided by the mass flow values above provides the time to dispense 1 cc of liquid through each nozzle. These values are shown in Table 7 below.

TABLE 7

Time to Dispense 1 cubic centimeter of liquid for
easy and hard forces for each nozzle

| Nozzle | Time to Dispense 1 cc (s) (Easy) | Time to Dispense 1 cc (s) (Hard) |
|---|---|---|
| O_015 | 1.52 | 1.20 |
| O_020 | 0.81 | 0.69 |
| O_025 | 0.72 | 0.56 |
| V21_070 | 0.72 | 0.47 |
| V21_100 | 0.40 | 0.27 |
| V21_145 | 0.42 | 0.24 |
| V21_200 | 0.40 | 0.21 |

Ease of use testing showed that a reasonable range of time for dispensing a dose of liquid concentrate is from about 0.3 seconds to about 3.0 seconds, which includes times that a consumer can control dispensing the liquid concentrate or would be willing to tolerate to get a reasonably determined amount of the liquid concentrate, A range of about 0.5 sec per cc to about 0.8 sec per cc provides a sufficient amount of time from a user reaction standpoint, with a standard dose of approximately 2 cc per 240 ml or approximately 4 cc for a standard size water bottle, while also not being overly cumbersome by taking too long to dispense the standard dose. The 0.020 inch Square Edge Orifice, the 0.025 inch Square Edge Orifice, and the 0.070 inch X Slit reasonably performed within these values regardless of whether an easy or a hard force was utilized.

The areas of each of the openings are shown in Table 8 below.

TABLE 8

Nozzle opening areas for easy and hard forces

| Nozzle | Opening Area (mm$^2$) (Easy) | Opening Area (mm$^2$) (Hard) |
|---|---|---|
| O_015 | 0.114 | 0.114 |
| O_020 | 0.203 | 0.203 |
| O_025 | 0.317 | 0.317 |
| V21_070 | 0.217 | 0.283 |
| V21_100 | 0.442 | 0.461 |
| V21_145 | 0.479 | 0.678 |
| V21_200 | 0.622 | 0.881 |

The SLA nozzle circular opening areas were calculated using $\pi r^2$. The areas of the X Slits were calculated by multiplying the calculated dispense quantity by one thousand and dividing by the calculated velocity for both the easy and the hard force.

Finally, the momentum-second was calculated for each nozzle using both the easy and the hard force. This is calculated by multiplying the calculated mass flow by the calculated velocity. Table 9 below displays these values.

TABLE 9

Momentum-second of each nozzle for easy and hard forces

| Nozzle | Momentum * Second (Easy) | Momentum * Second (Hard) |
|---|---|---|
| O_015 | 3803 | 6556 |
| O_020 | 7420 | 11686 |
| O_025 | 8854 | 15457 |
| V21_070 | 8875 | 15781 |
| V21_100 | 13852 | 30502 |
| V21_145 | 11660 | 25496 |
| V21_200 | 9961 | 25068 |

Momentum-second values correlate to the mixing ability of a jet of liquid exiting a nozzle because it is the product of the mass flow and the velocity, so it is the amount and speed of liquid being dispensed from the container. Testing, however, has shown that a range of means that a consumer will dispense a generally equal amount of liquid concentrate even when differing squeeze forces are used. This advantageously supplies an approximately uniform mixture for equal squeeze times with differing squeeze forces. As shown above, mimicking the performance of an orifice with a valve can result in more consistent momentum-second values for easy versus hard squeezes while also providing the anti-drip functionality of the valve.

Figure 27:
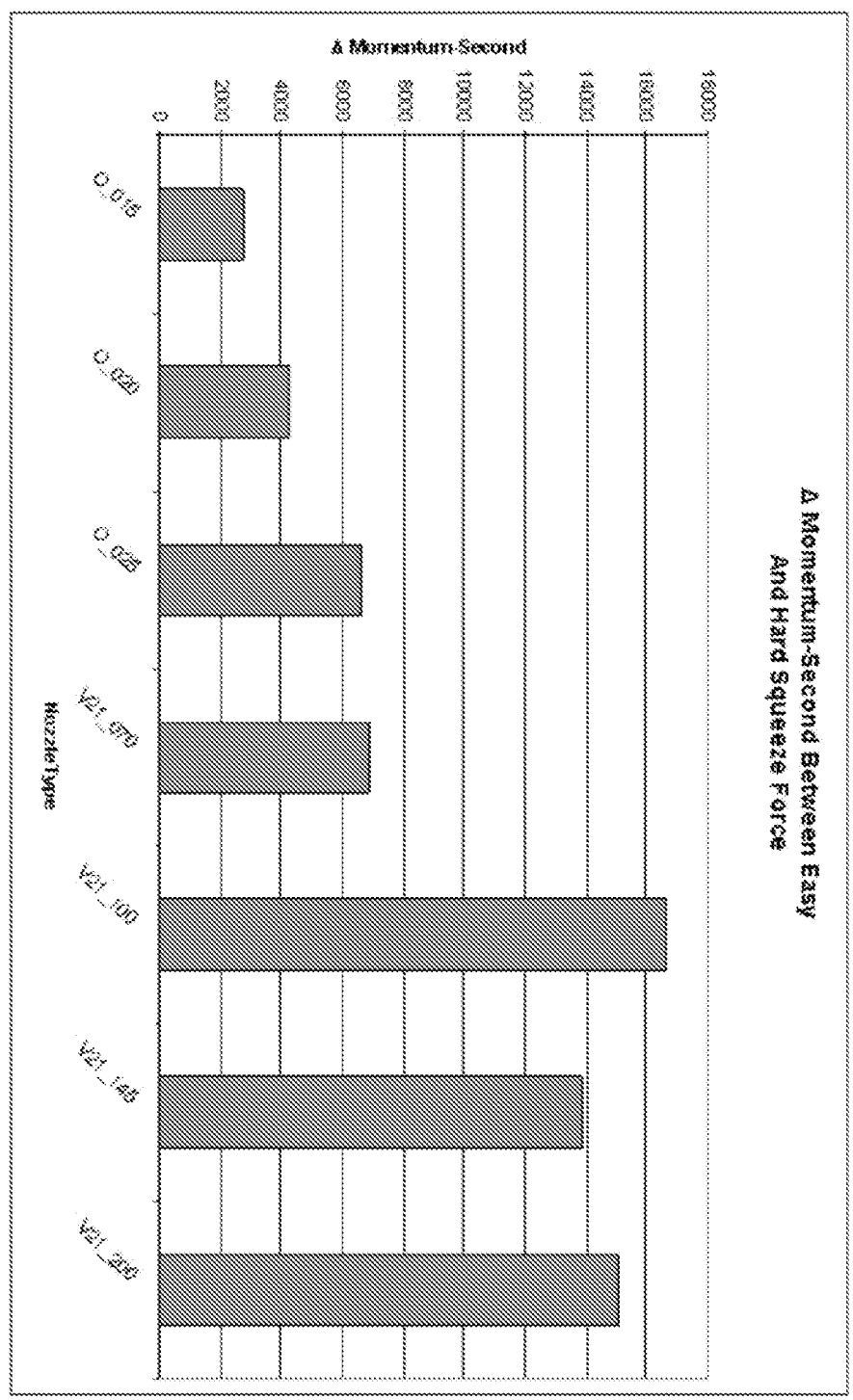
FIG. 27 is a graph showing the difference of the Momentum-Second between easy and hard forces for tested nozzles.

As illustrated in FIG. 27, the graph shows the difference for the Momentum-Second values between the easy and hard forces for each nozzle. When applied to a liquid concentrate setting, momentum-second having a relatively small delta value for Momentum-Second is desirable because a delta value of zero coincides with a constant momentum-second regardless of squeeze force. A delta momentum-second value of less than approximately 10,000, and preferably 8,000 provides a sufficiently small, variance in momentum-second between an easy force and a hard force so that a jet produced by a container having this range will have a generally equal energy impacting a target liquid, which will produce a generally equal mixture. As shown, all of the Orifice openings and the 0.070 inch X Slit produced a momentum-second that would produce generally comparable mixtures whether utilizing a hard force and an easy force.

Yet another important feature is the ability of a liquid concentrate container to dispense liquid concentrate generally linearly throughout a range of liquid concentrate fill amounts in the container when a constant pressure is applied for a constant time. The nozzles were tested to determine the weight amount of liquid concentrate dispensed at a pressure that achieved a minimum controllable velocity for a constant time period when the liquid concentrate was filled to a high, a medium, and a low liquid concentrate level within the container. Table 10 shows the results of this test below.

TABLE 10

Dispense amount with variable liquid concentrate fill

| Nozzle | High (g) | Medium (g) | Low (g) |
|---|---|---|---|
| O_015 | 0.45 | 0.49 | 0.52 |
| O_020 | 0.89 | 0.82 | 0.82 |
| O_025 | 1.25 | 1.34 | 1.38 |
| V21_070 | 0.78 | 0.89 | 0.90 |
| V21_100 | 2.14 | 2.21 | 2.19 |
| V21_145 | 4.20 | 3.46 | 4.37 |
| V21_200 | 4.60 | 4.74 | 5.80 |

Figure 28:
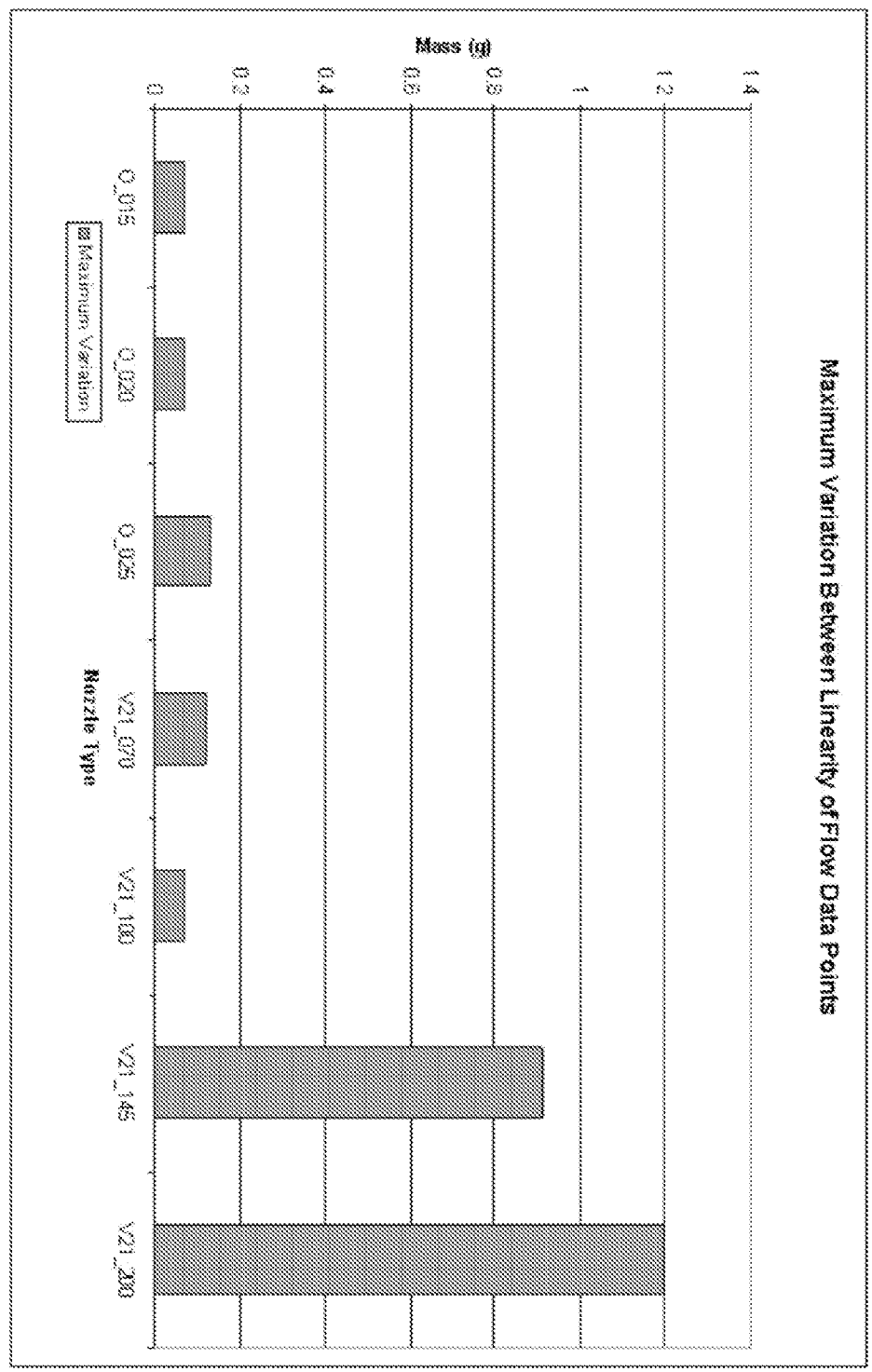
FIG. 28 is a graph showing the maximum difference between two Linearity of Flow test data points for tested nozzles.

As discussed above, a good linearity of flow, or small mass change as the container is emptied, allows a consumer to use a consistent technique, consistent pressure applied for a consistent time period, at any fill level to dispense a consistent amount of liquid concentrate. FIG. 28 shows a graph displaying the maximum variation between two values in Table 10 for each nozzle. As shown in FIG. 28 and in Table 10, the maximum variation for all of the Square Edge Orifice nozzles and the 0.070 inch and the 0.100 inch X Slit nozzles is less than 0.15 grams spanning a high, medium, or low fill of liquid concentrate in the container. The 0.145 inch and the 0.200 inch X Slit nozzles, however, were measured to have a maximum variation of 0.91 grams and 1.2 grams respectively. This is likely due to the variability inherent in the altering opening area with different pressures in combination with the larger amount of liquid flowing through the nozzle. Accordingly, a desirable nozzle has a maximum variation for linearity of flow at varying fill levels of less than 0.5 grams, and preferably less than 0.3 grams, and more preferably less than 0.15 grams.

The drawings and the foregoing descriptions are not intended to represent the only forms of the containers and methods in regards to the details of construction. Changes in form and in proportion of parts, as well as the substitution of equivalents, are contemplated as circumstances may suggest or render expedient.

The invention claimed is:

1. A container for dispensing a beverage concentrate formed of at least a first beverage concentrate component and a second, different beverage concentrate component, the container comprising:
    an enclosed body for containing a first beverage component and having a neck disposed about an opening;
    a cartridge for containing a second beverage component and having an upper portion slidably received within the neck of the body and moveable from a first position to a second position, the upper portion having at least one outlet port forming part of a mixing flow path between the cartridge and the body, the mixing flow path being blocked when the cartridge is in the first position, the mixing flow path being open when the cartridge is in the second position and inverted to permit the second beverage component to exit the cartridge into the body through the at least one outlet port and to mix with the first beverage component in the body to form a beverage concentrate; and
    a cap secured relative to the neck and moveable from a first position to a second position relative to the neck effective to move the cartridge from the first position to the second position;
    wherein the cartridge has a closed bottom end and wherein the upper portion of the cartridge comprises an open upper end, wherein with the cap in the second position the cartridge is configured to provide fluid communication between an interior of the body and an exterior of the body, wherein an exit flow path for the beverage concentrate from the body extends from the interior of the body through the at least one outlet port into the cartridge and through the open upper end of the cartridge to the exterior of the body when the cartridge and the cap are in the second position, and wherein the outlet port is closer to the open upper end than the closed bottom end.

2. The container of claim 1, wherein the cartridge includes a ring configured to abut an inner surface of the neck at a location on an opposite side of the flow port from the opening of the body when the cap is in the first position to block flow fluid therepast, the ring being at least partially spaced from the inner surface of the neck when the cartridge is in the second position to permit fluid flow therepast.

3. The container of claim 2, wherein the cartridge further comprises a sidewall, a portion of the sidewall extending from the closed bottom end of the cartridge to the ring, a portion of the sidewall of the cartridge extending from the ring to the open upper end of the cartridge, and a portion of the sidewall of the cartridge surrounding the at least one outlet port.

4. The container of claim 2, wherein the ring is configured to frictionally engage the neck of the body for restricting movement of the cartridge from the first position to the second position until sufficient force has been applied.

5. The container of claim 4, wherein the cartridge further a comprises a ramp on an opposite side of the flow port from the ring and configured to frictionally engage the neck of the body for restricting movement of the cartridge from the second position back to the first position.

6. The container of claim 5, wherein the cap further comprises an inwardly extending ramp configured to abut the neck of the body for restricting movement of the cap from the first position to the second position until sufficient force has been applied.

7. The container of claim 6, wherein the inwardly extending ramp is configured to abut the neck of the body for restricting movement of the cap from the second position back to the first.

8. The container of claim 7, wherein the inwardly extending ramp is configured to extend into an upper groove formed on the neck of the body, and wherein the inwardly extending ramp is configured to extend into a lower groove formed on the neck of the body on an opposite side of the upper groove relative to the opening about which the neck is disposed.

9. The container of claim 1, further comprising a nozzle member disposed in an outlet orifice of the cap, the nozzle member having flaps that can shift outwardly from an unflexed configuration to a flexed configuration to form an exit opening of the nozzle member when the body is squeezed to force the liquid beverage concentrate from the interior of the body and through the exit opening and the flaps can return toward their unflexed configuration when the body is no longer being squeezed.

10. The container of claim 9, wherein the cap is configured to attach to the neck of the body and includes a lid hinged relative to the cap.

11. The container of claim 10, wherein:
the body has a closed bottom end, a top end having a shoulder narrowing to the neck and a sidewall extending between the top and bottom ends;
the cap includes an exterior skirt; and
the lid includes an exterior portion configured to be aligned with the exterior skirt when the lid is seated on the cap.

12. The container of claim 9, wherein the nozzle member is configured such that the maximum variance in thrust of a jet of beverage concentrate exiting the container for a hard squeeze force resulting in a mass flow rate of about 2.1 g/s as compared to a soft squeeze force resulting in a mass flow rate of about 1.4 g/s is less than about 8000 g*mm/s$^2$.

13. The container of claim 12, wherein the variance in thrust is less than about 6000 g*mm/s$^2$.

14. The container of claim 9, wherein the nozzle member is configured such that the maximum variance in mass flow rate of a jet of beverage concentrate exiting the container in response to a squeeze force resulting in a mass flow rate of about 2.1 g/s as compared to a squeeze force resulting in a mass flow rate of about 1.4 g/s is less than about 1 g/s.

15. The container of claim 9, wherein the nozzle member is configured such that the Mixing Ability Value of a jet of beverage concentrate exiting the container for a squeeze force resulting in a mass flow rate of about 1.4 g/s is equal to or less than 2.

16. The container of claim 9, wherein the nozzle member is configured such that the Splash Value of a jet of beverage concentrate exiting the container for a squeeze force resulting in a mass flow rate of about 1.4 g/s is equal to or less than 2.

17. The container of claim 1, wherein the at least one outlet port further comprises a plurality of outlet ports each having a complete perimeter.

18. The container of claim 1, further comprising a nozzle member including a valve having a flexible membrane and wherein the cap includes an inner plug positioned in contact with the flexible membrane when the cap is in the first position and the flexible membrane is in a concave orientation, the inner plug being configured to restrict movement of the flexible membrane from the concave orientation to a convex orientation.

* * * * *